(12) United States Patent
Kimura et al.

(10) Patent No.: US 8,060,305 B2
(45) Date of Patent: Nov. 15, 2011

(54) VEHICLE DRIVING ASSIST SYSTEM

(75) Inventors: Takeshi Kimura, Yokohama (JP);
Yosuke Kobayashi, Yokohama (JP);
Nobuyuki Kuge, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 1183 days.

(21) Appl. No.: 11/764,837

(22) Filed: Jun. 19, 2007

(65) Prior Publication Data

US 2008/0004806 A1 Jan. 3, 2008

(30) Foreign Application Priority Data

Jun. 28, 2006 (JP) ................................. 2006-178192

(51) Int. Cl.
*G08G 1/16* (2006.01)
(52) U.S. Cl. ............ 701/301; 340/436; 701/300; 701/45
(58) Field of Classification Search .......... 701/300–301, 701/96, 36, 45; 342/455; 340/435–436, 340/903, 466; 307/9.1; 706/905
See application file for complete search history.

(56) References Cited

U.S. PATENT DOCUMENTS

| | | | | |
|---|---|---|---|---|
| 5,586,028 | A * | 12/1996 | Sekine et al. | 701/1 |
| 5,618,178 | A * | 4/1997 | Copperman et al. | 434/62 |
| 6,882,915 | B2 * | 4/2005 | Yamamura et al. | 701/45 |
| 6,934,614 | B2 * | 8/2005 | Yamamura et al. | 701/45 |
| 7,069,146 | B2 * | 6/2006 | Yamamura et al. | 701/301 |
| 7,136,755 | B2 * | 11/2006 | Yamamura | 701/301 |
| 7,555,367 | B2 * | 6/2009 | Kuge | 701/1 |
| 7,560,826 | B2 * | 7/2009 | Hijikata et al. | 307/9.1 |
| 7,689,361 | B2 * | 3/2010 | Hijikata | 701/301 |
| 7,715,972 | B2 * | 5/2010 | Kuge | 701/96 |
| 7,725,228 | B2 * | 5/2010 | Kobayashi et al. | 701/45 |
| 7,746,221 | B2 * | 6/2010 | Jung | 340/435 |
| 7,809,506 | B2 * | 10/2010 | Kuge et al. | 701/301 |

(Continued)

FOREIGN PATENT DOCUMENTS

EP 2005053173 * 7/2005

(Continued)

OTHER PUBLICATIONS

Online Spatio-Temporal Risk Assessment for Intelligent Transportation Systems; Linda, O.; Manic, M.; Intelligent Transportation Systems, IEEE Transactions on ; vol. PP , Issue: 99; Digital Object Identifier: 10.1109/TITS.2010.2076807; Publication Year: 2010 , pp. 1-7.*

(Continued)

*Primary Examiner* — Cuong H Nguyen
(74) *Attorney, Agent, or Firm* — Global IP Counselors, LLP

(57) ABSTRACT

A vehicle driving assist system is provided with a risk factor detection section, a first risk potential calculation section, a second risk potential calculation section and a risk potential notification section. The risk factor detection section detects a plurality of potential risk factors related to a host vehicle. The first risk potential calculation section calculates a first risk potential attributed to a first risk factor from the risk factors that were detected. The second risk potential calculation section calculates a second risk potential attributed to a second risk factor that is different than the first risk factor from the risk factors that were detected. The risk potential notification section notifies a driver of the first risk potential with a first risk potential notification and the second risk potential with a second risk potential notification using a common risk notification device with the first and second notifications being different.

20 Claims, 24 Drawing Sheets

U.S. PATENT DOCUMENTS

| | | | |
|---|---|---|---|
| 7,826,970 B2 * | 11/2010 | Kobayashi et al. | 701/300 |
| 2004/0249550 A1 * | 12/2004 | Yamamura | 701/96 |
| 2005/0110348 A1 * | 5/2005 | Hijikata et al. | 307/10.1 |
| 2005/0131589 A1 * | 6/2005 | Yamamura et al. | 701/1 |
| 2005/0149251 A1 * | 7/2005 | Donath et al. | 701/200 |
| 2005/0187713 A1 * | 8/2005 | Yamamura et al. | 701/301 |
| 2005/0275520 A1 * | 12/2005 | Hijikata et al. | 340/466 |
| 2006/0116807 A1 * | 6/2006 | Hijikata | 701/96 |
| 2006/0145827 A1 * | 7/2006 | Kuge et al. | 340/439 |
| 2007/0150159 A1 * | 6/2007 | Linden | 701/96 |

FOREIGN PATENT DOCUMENTS

| | | | |
|---|---|---|---|
| FR | 00410149 A * | | 9/2004 |
| JP | 2003-063430 | | 3/2003 |
| JP | 2003-159296 | * | 6/2003 |
| JP | 2003-193013 | * | 7/2003 |
| JP | 2004-328820 | * | 11/2004 |
| JP | 2004-341718 | * | 11/2004 |
| JP | 2005-205238 | * | 7/2005 |
| WO | WO 2006032549 A2 * | | 3/2006 |

OTHER PUBLICATIONS

Using Stochastic Petri Nets for Level-Crossing Collision Risk Assessment; Ghazel, M.; Intelligent Transportation Systems, IEEE Transactions on; vol. 10 , Issue: 4; Digital Object Identifier: 10.1109/TITS.2009.2026310; Publication Year: 2009 , pp. 668-677.*

Research on Fuzzy Inference of Driver's Risk Perception of Rear-End Collision on Freeway; Lu Siwen; Zheng Shiwen; Intelligent Computation Technology and Automation, 2009. ICICTA '09. Second International Conference on; vol. 2; Digital Object Identifier: 10.1109/ICICTA.2009.422; Publication Year: 2009 , pp. 772-775.*

Application of Composite Grey BP Neural Network Forecasting Model to Motor Vehicle Fatality Risk ; Xinglin Zhu; Computer Modeling and Simulation, 2010. ICCMS '10. Second International Conference on; vol. 2; Digital Object Identifier: 10.1109/ICCMS.2010. 257; Publication Year: 2010 , pp. 236-240.*

Maneuver-Based Trajectory Planning for Highly Autonomous Vehicles on Real Road With Traffic and Driver Interaction Glaser, S.; Vanholme, B.; Mammar, S.; Gruyer, D.; Nouvelière, L.; Intelligent Transportation Systems, IEEE Trans. on vol. 11 , Issue: 3; Digital Object Identifier: 10.1109/TITS.2010.2046037; Publ. Year: 2010 , pp. 589-606.*

A comprehensive speed control model for human drivers with application to intersection left turns; Nobukawa, Kazutoshi; Gordon, Timothy J.; Barnes, Michelle A.; Goodsell, Robert J.; American Control Conference (ACC), 2011; Publication Year: 2011 , pp. 3065-3070.*

Combining safety margins and user preferences into a driving criterion for optimal control-based computation of reference maneuvers for an ADAS of the next generation; Biral, F.; Da Lio, M.; Bertolazzi, E.; Intelligent Vehicles Symposium, 2005. Proceedings. IEEE; Digital Object Identifier: 10.1109/IVS.2005.1505074; Pub. Yr: 2005 , pp. 36-41.*

* cited by examiner

|  |  | WIPER OPERATING STATE | | |
|---|---|---|---|---|
|  |  | STOPPED OR INTERMITTENT | CONTINUOUS OPERATION | HIGH SPEED OPERATION |
| STATE OF LIGHTS | HEADLIGHTS OFF | STATE 1 | STATE 2 | STATE 3 |
|  | HEADLIGHTS ON | STATE 2 | STATE 3 | STATE 4 |
|  | FOG LAMPS ON | STATE 3 | STATE 4 | STATE 4 |

VEHICLE DRIVING ASSIST SYSTEM

CROSS-REFERENCE TO RELATED APPLICATIONS

This application claims priority to Japanese Patent Application No. 2006-178192 filed on Jun. 28, 2006. The entire disclosure of Japanese Patent Application No. 2006-178192 is hereby incorporated herein by reference.

BACKGROUND OF THE INVENTION

1. Field of the Invention

The present invention relates to a vehicle driving assist system for assisting driver operations.

2. Background Information

Various vehicle driving assist systems has been proposed to assist a driver with respect to the operation of a host vehicle. An example of a vehicle assist system is disclosed in Japanese Laid-Open Patent Application No. 2003-63430. This vehicle driving assist system detects various obstacles around the host vehicle, and notifies the driver to reduce the frequency at which the host vehicle approaches these obstacles. The vehicle driving assist system in the cited publication continuously varies the accelerator pedal operation reaction force and the steering reaction force, based on a running state of the host vehicle and a traveling environment surrounding the vehicle.

SUMMARY OF THE INVENTION

The vehicle driving assist system cited in the above-described publication is capable of notifying the driver of various risks surrounding the host vehicle by varying an accelerator pedal operation reaction force and the steering reaction force. However, there are many risk factors that affect the vehicle and it is difficult for the driver to separately ascertain a plurality of risk factors from the accelerator pedal operation reaction force and the steering reaction force.

In accordance with one aspect of the present invention, a vehicle driving assist system is provided that basically comprises a risk factor detection section, a first risk potential calculation section, a second risk potential calculation section and a risk potential notification section. The risk factor detection section is configured to detect a plurality of potential risk factors related to a host vehicle. The first risk potential calculation section is configured to calculate a first risk potential attributed to a first risk factor from the risk factors that were detected. The second risk potential calculation section is configured to calculate a second risk potential attributed to a second risk factor that is different than the first risk factor from the risk factors that were detected. The risk potential notification section is configured to notifying a driver of the first risk potential calculated by the first risk potential calculation section with a first risk potential notification and the second risk potential calculated by the second risk potential calculation section with a second risk potential notification using a common risk notification device for both the first and second notifications with the first and second notifications being different.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
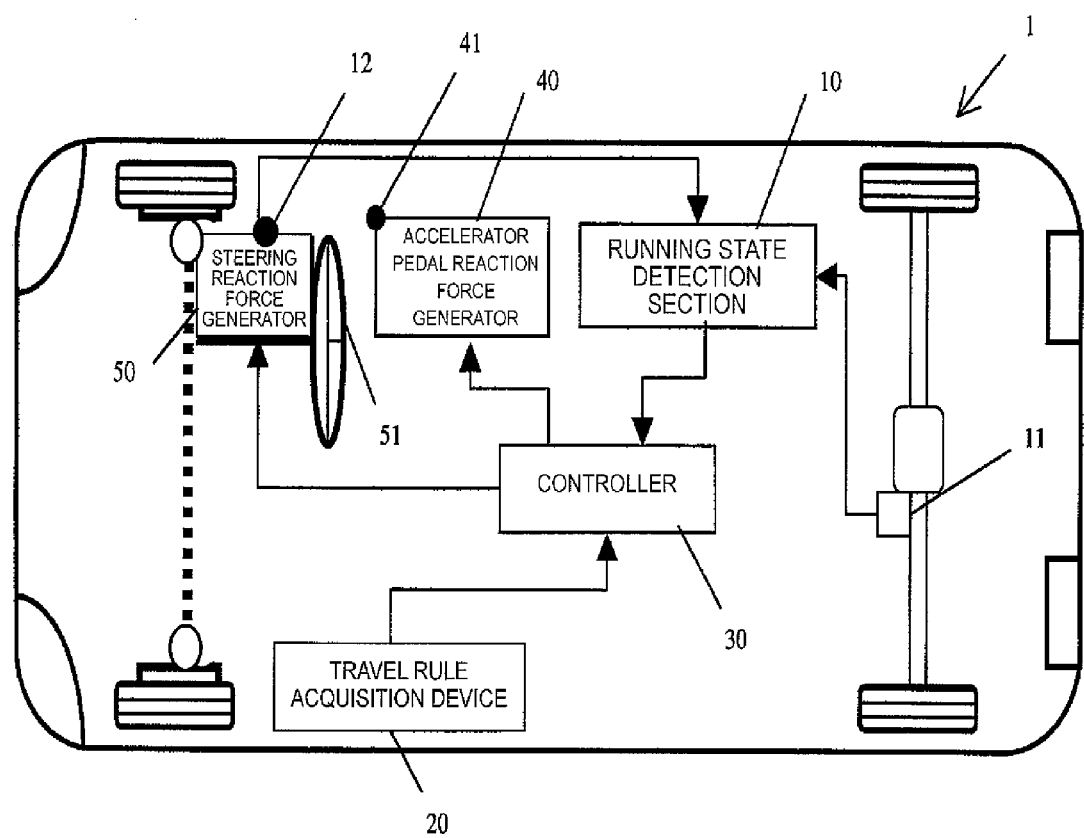
FIG. 1 is a simplified diagrammatic view of a vehicle in which the vehicle driving assist system is installed in accordance with a first embodiment of the present invention.

Referring initially to FIG. 1, a host vehicle is illustrated that is equipped with a vehicle driving assist system 1 in accordance with a first embodiment of the present invention. The vehicle driving assist system 1 basically includes, among other things, a vehicle running state detection section 10, a travel rule acquisition section 20, a controller 30, an accelerator pedal reaction force generator 40 and a steering reaction force generator 50. As explained below in greater detail, the vehicle driving assist system 1 detects a plurality of risk factors related to the host vehicle and then distinctly notifies the driver in a manner that is easy to perceive which of the risk factors is being indicated. For example, in the illustrated embodiment, at least two different types of risk potentials R11, and R12 are detected and indicated to the driver. The risk potential R11 includes host vehicle risk factors that are attributed to the kinetic energy of the host vehicle. The risk potential R11 is typically calculated based on the information related to the running state of the host vehicle. The risk potential R12 includes host vehicle risk factors that are attributed to a travel rule(s) affecting the host vehicle. The risk potential R12 is typically calculated based on the road related information (road attributes) such as roads on which travel is not permitted, recommended speed, etc.

The vehicle running state detection section 10 detects the running state of the host vehicle. The vehicle running state detection section 10 includes a vehicle speed sensor 11, a steering angle sensor 12, and the like. The vehicle speed sensor 11 detects the speed of the host vehicle by measuring the rotational speed of the wheels or the rotational speed on the output side of the transmission. The steering angle sensor 12 is an angle sensor that is mounted in the vicinity of, e.g., a steering column or a steering wheel 51, and that detects the steering angle produced when the driver turns the steering wheel 51 and causes the steering column to rotate. The vehicle running state detection section 10 is further provided with sensors that detect the yaw rate, the lateral acceleration, and forward/rearward acceleration of the host vehicle.

The travel rule acquisition section 20 acquires information related to the travel rule to be followed when the host vehicle is traveling on a road. For example, the travel rule acquisition section 20 includes a navigation system for guiding the host vehicle. The navigation system is provided with a recommended speed database that is associated with map information. In this case, the recommended speed is based on the speed limit of the road on which the host vehicle is traveling. The speed limit of the road is set as the speed recommended for traveling so that the host vehicle does not exceed the upper speed limit. Thus, the recommended speed is a set as a travel rule for that road by the travel rule acquisition section 20. Also, the travel rule acquisition section 20 acquires the recommended speed information, information on roads on which travel is not permitted, and other information from the navigation system in accordance with the traveling position of the host vehicle. Form this information, the travel rule acquisition section 20 sets a travel rule (including one or more factors) for the host vehicle.

The controller 30 is composed of a CPU, a ROM, a RAM, and other CPU peripheral components, and controls the entire vehicle driving assist system 1. Specifically, the controller 30 calculates a first risk potential R1 of the host vehicle related to the running state of the host vehicle inputted from the vehicle running state detection section 10, and calculates a second risk potential R2 of the host vehicle related to the travel rule inputted from the travel rule acquisition section 20. Also calculated are the reaction force incrementally generated in the accelerator pedal 41 and the reaction force incrementally generated in the steering wheel 51 on the basis of risk potentials R1 and R2, respectively.

The accelerator pedal reaction force generator 40 incrementally generates operation reaction force in the accelerator pedal 41 in accordance with the command value from the controller 30. The accelerator pedal reaction force generator 40 is provided with a servomotor (not shown) incorporated, for example, into the link mechanism of the accelerator pedal 41. The accelerator pedal reaction force generator 40 controls the torque generated by the servomotor in accordance with the reaction force command value. The servomotor is a reaction force actuator that generates operation reaction force and that is capable of arbitrarily controlling the operation reaction force (depression force) generated when the driver operates the accelerator pedal 41. The base reaction force characteristics (see FIG. 7) of a case in which the reaction force is not under the control of the accelerator pedal reaction force generator 40 is set so that a greater reaction force is generated as the depression value of the accelerator pedal 41 is increased by the spring force of a return spring (not shown), for example.

The steering reaction force generator 50 is incorporated into the steering system of the vehicle. The steering reaction force generator 50 is used to incrementally generate steering reaction force in the steering wheel 51 in accordance with the command value from the controller 30. The steering reaction force generator 50 is provided with a servomotor (not shown) that is used to control the torque generated by the servomotor in accordance with the command value. The servomotor is capable of using torque control to arbitrarily control the steering reaction force generated when the driver operates the steering wheel 51. In the illustrated embodiment, the accelerator pedal 41 and the steering wheel 51 are driver-operated driving operation devices that are used as the risk notification device.

Next, the operation of the vehicle driving assist system 1 according to the first embodiment will be described above. First, an outline of the operation will be provided.

Various risks are generated when the host vehicle is traveling. The generated risk-factors include obstacle related risk factors and non-obstacle related risk factors. The obstacle related risk factors include the state of obstacles in an area around the host vehicle, obstacles in which the magnitude of the risk continuously changes (continuous risk factors), and obstacles in which the magnitude of the risk suddenly changes (event-related risk factors). The other non-obstacle related risk factors include, but not limited to, risks brought about by the kinetic energy of the host vehicle and a travel rule that are related to the host vehicle traveling condition but unrelated to specifically detected obstacles in the area around the host vehicle. When, for example, the vehicle speed increases and greater kinetic energy is produced, these factors will have greater effect in that more time is required to stop the vehicle in an unforeseen situation. Therefore, kinetic energy and the physical amount of the kinetic energy can be risk factors attributed to the host vehicle. The travel rule (one or more traffic rules) is generally one or more artificially imposed rules. Thus, the travel rule is also a risk factor attributed to the host vehicle because there is a greater possibility that an unforeseen situation will occur when the vehicle is running without following the travel rule. The term "travel rule" as used herein includes a single risk factor and a plurality of risk factors. In other words, two travel rules can be collectively considered as a single travel rule.

In view of this situation, the controller 30 calculates the first risk potential R1 of the host vehicle attributed to kinetic energy and the second risk potential R2 of the host vehicle attributed to the travel rule. The risk potentials R1 and R2 are values that are set in order to express as physical values the magnitude of the potential risk of the host vehicle. In other words, the greater the risk is, the greater theses values will be. The risk potentials R1 and R2 are indicated to the driver by incrementally generating operation reaction force in the accelerator pedal 41 and the steering wheel 51 on the basis of the risk potentials R1 and R2.

However, since the risk factors of the risk potentials R1 and R2 are different, the method for generating a reaction force for the first risk potential R1 is different from the method for generating a reaction force for the second risk potential R2. Based on the accelerator pedal operation reaction force and the steering reaction force, the driver can thereby easily perceive that risks attributed to different factors are occurring.

Figure 2:
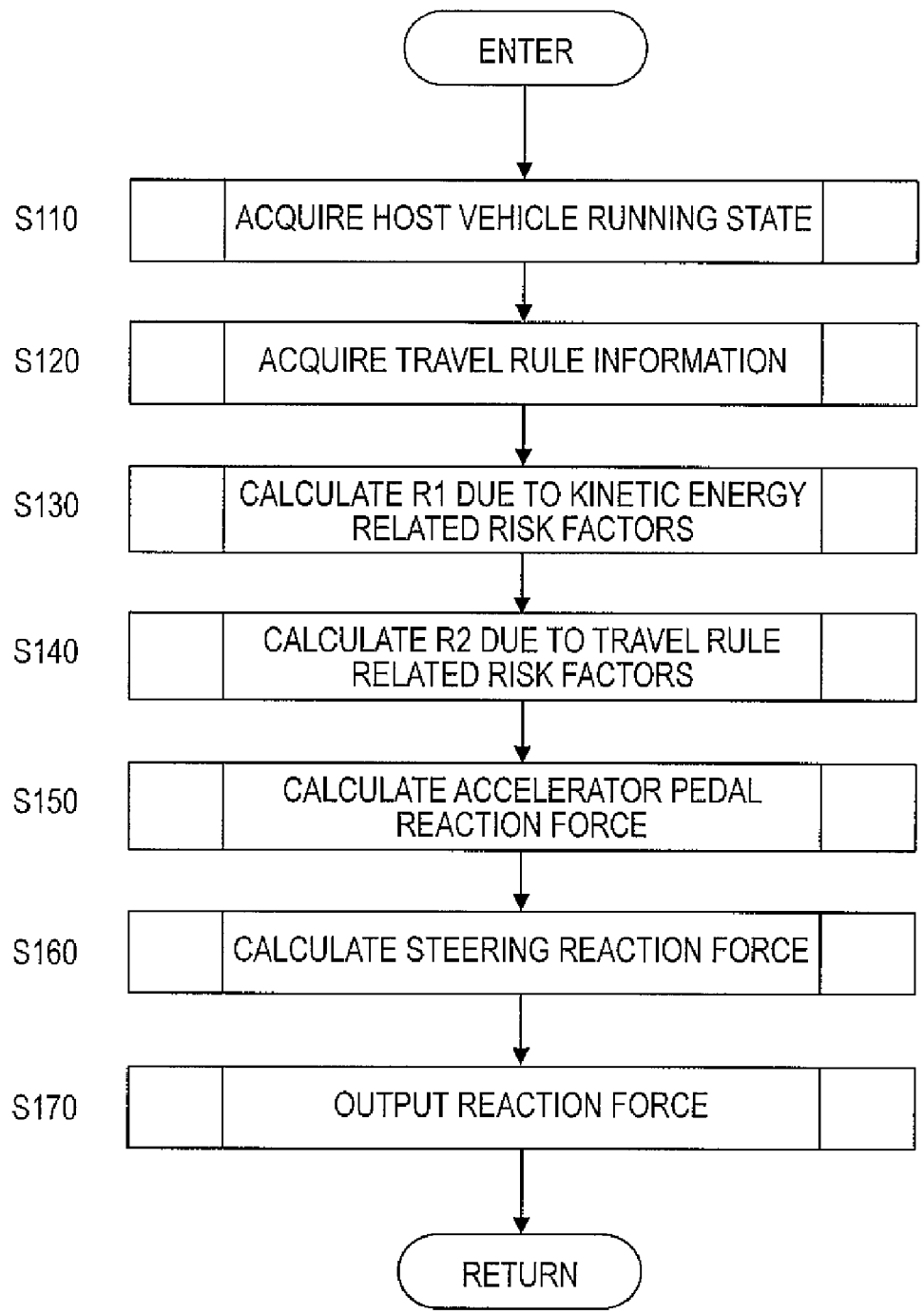
FIG. 2 is a flowchart showing the control processing steps executed by a vehicle driving assist control program according to the first embodiment.

The operation of the vehicle driving assist system 1 according to the first embodiment will now be described in more detail below with reference to FIG. 2. As seen in FIG. 2, a flowchart illustrates a processing sequence for a vehicle driving assist control program in the controller 30. The processing steps are carried out in a continuous fashion at fixed intervals (50 msec, for example).

The physical values representing the vehicle running state are acquired by the vehicle running state detection section 10 in step S110. Examples of some of factors contributing to the vehicle running state include, but not limited to, a vehicle speed V1, a steering angle $\delta$, a yaw rate $\theta$, a lateral acceleration ay, and a forward/rearward acceleration ax.

In step S120, the travel rule acquisition section 20 acquires, as part of the travel rule, the non-obstacle related risk factors such as travel rule information related to the recommended speed of the road on which the host vehicle is currently traveling and information related to roads on which travel is not permitted. Specifically, the coordinates (latitude and longitude) of the current position of the host vehicle are detected in the navigation system, and the road on which the host vehicle is currently traveling is identified based on map information. The road information (road attributes), including the recommended speed, is acquired for the road on which the host vehicle is currently traveling. Also the travel rule acquisition section 20 acquires, as part of the travel rule, information related to branching roads that are ahead in the direction in which the host vehicle is traveling (including information related to roads on which travel is not permitted). Thus, information is obtained to formulate a travel rule, which can be composed of a single factor or multiple factors.

In step S130, the first risk potential R1 attributed to the kinetic energy of the host vehicle is calculated based on the information related to the state of the host vehicle acquired in step S110. In the illustrated embodiment, both the first risk potential R1_X in the forward/rearward direction related to movement in the forward/rearward direction of the host vehicle and the first risk potential R1_Y in the left/right direction related to movement in the right/left direction are calculated.

Figure 3:
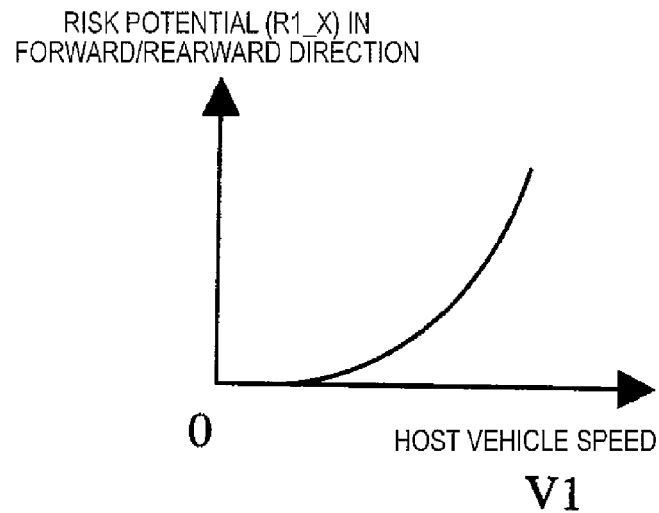
FIG. 3 is a diagram showing the relationship between the host vehicle speed and the risk potential in the forward/rearward direction attributed to kinetic energy.
Figure 4:
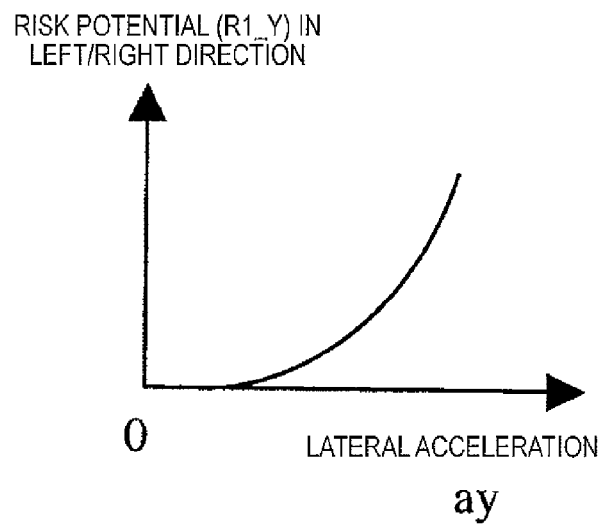
FIG. 4 is a diagram showing the relationship between the lateral acceleration and the risk potential in the left/right direction attributed to kinetic energy.

The first risk potential R1_X in the forward/rearward direction is calculated based on the host vehicle speed V1, for example. FIG. 3 shows the relationship between the host vehicle speed V1 and the first risk potential R1_X in the forward/rearward direction. The first risk potential R1_X in the forward/rearward direction increases exponentially with increased host vehicle speed V1, i.e., increased kinetic energy in the forward/rearward direction. The first risk potential R1_Y in the left/right direction is calculated based on the lateral acceleration ay of the host vehicle, for example. FIG. 4 shows the relationship between the lateral acceleration ay and the first risk potential R1_Y in the left/right direction. The first risk potential R1_Y in the left/right direction increases exponentially with increased lateral acceleration ay, i.e., increased kinetic energy in the left/right direction. The lateral acceleration ay is expressed by a positive value when the lateral acceleration is in the right direction and by a negative value when the lateral acceleration is in the left direction. The absolute value of lateral acceleration ay is used when the first risk potential R1_Y in the left/right direction is calculated.

In step S140, the second risk potential R2 attributed to the travel rule of the host vehicle is calculated based on the road information (road attributes) such as the roads on which travel is not permitted, and the recommended speed information acquired in step S120. In the illustrated embodiment, both the second risk potential R2_X in the forward/rearward direction based on the recommended speed information, and the second risk potential R2_Y in the left/right direction based on the information related to roads on which travel in not permitted are calculated. When the host vehicle speed V1 has exceeded the recommended speed, it is determined that the risk in the forward/rearward direction of the vehicle is high, and the second risk potential R2_X in the forward/rearward direction is set to 1 (i.e., R2_X=1). When the host vehicle speed V1 is equal to or less than the recommended speed, it is determined that the risk is low and R2_X is set to 0 (i.e., R2_X=0).

The second risk potential R2_Y in the left/right direction is calculated based on whether the road in the forward direction of the host vehicle is a road on which travel is not permitted. In view of this calculation, a determination is made based on the steering angle 6 acquired in step S110 as to whether the host vehicle is attempting a left or right turn. When the host vehicle is attempting to make a right turn but the road resulting from the right turn is a road on which travel is not permitted, it is determined that the risk in the right direction is high and R2_Y is set to 1 (i.e., R2_Y=1). On the other hand, when the host vehicle is attempting to make a left turn but the road resulting from the left turn is a road on which travel is not permitted, it is determined that the risk in the left direction is considerable and R1_Y is set to −1 (i.e., R2_Y=−1). In cases other than these, the risk is determined to be low, and thus, R2_Y is set to 0 (i.e., R2_Y=0 when the roads resulting from a left or right turn are not roads on which travel is not permitted or when the host vehicle is traveling straight ahead).

Figure 5:
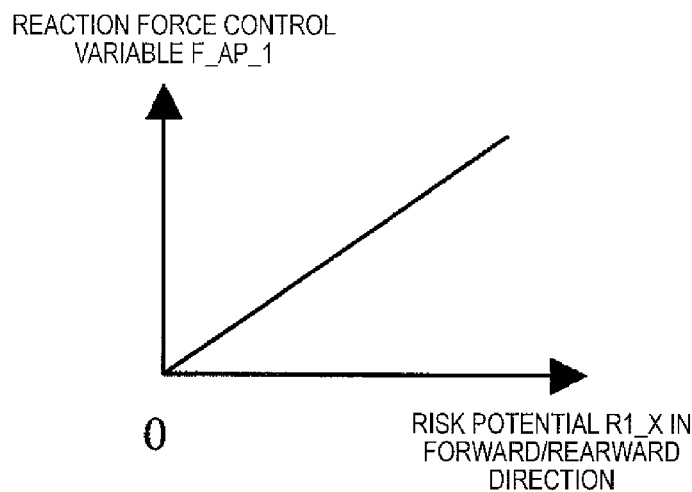
FIG. 5 is a diagram showing the relationship between the reaction force control variable and the risk potential in the forward/rearward direction.

In step S150, the command value F_AP of the operation reaction force to be added to the accelerator pedal 41 is calculated based on the risk potentials R1_X and R2_X in the forward/rearward direction calculated in steps S130 and S140. First, the reaction force control variable F_AP_1 is calculated based on the first risk potential R1_X in the forward/rearward direction attributed to the kinetic energy of the host vehicle. The reaction force control variable F_AP_1 is set so as to increase with increased risk potential R1_X in the forward/rearward direction, as shown in FIG. 5.

Next, the reaction force control variable F_AP_2 is calculated based on the second risk potential R2_X in the forward/rearward direction attributed to the travel rule of the host vehicle. When the second risk potential R2_X in the forward/rearward direction is equal to 0, i.e., when the host vehicle speed V1 is equal to or less than the recommended speed, the reaction force control variable F_AP_2 is set to 0. When the second risk potential R2_X in the forward/rearward direction is equal to 1, i.e., when the host vehicle speed V1 exceeds the recommended speed, the reaction force control variable F_AP_2 is set to a prescribed value F1. The prescribed value F1 is a value that allows the driver to clearly perceive a change in reaction force when F1 is added to the operation reaction force.

The command value F_AP of the accelerator reaction force is calculated from the following Equation (1) on the basis of the reaction force control variables F_AP_1 and F_AP_2.

$$F\_AP = F\_AP\_1 + F\_AP\_2 \qquad (1)$$

Figure 6:
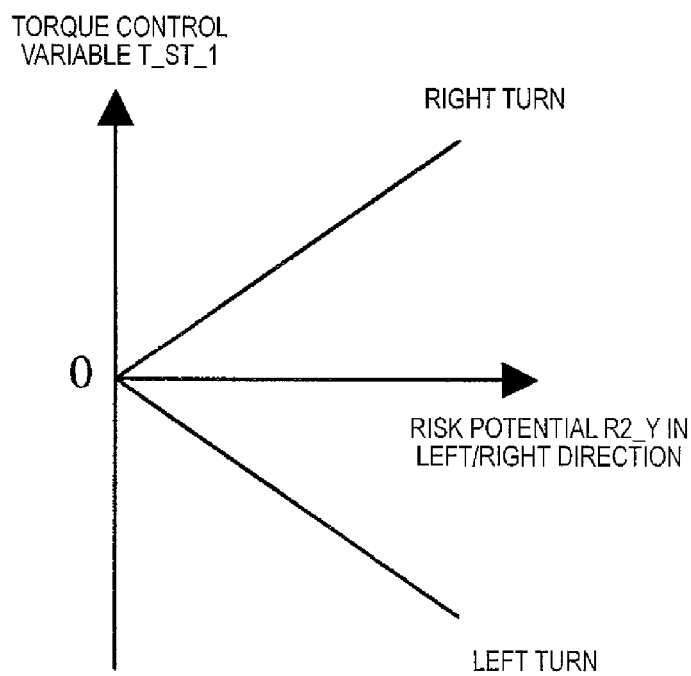
FIG. 6 is a diagram showing the relationship between the torque control variable and the risk potential in the left/right direction.

In step S160, the torque command value T_ST to be added to the steering wheel 51 is calculated based on the risk potentials R1_Y and R2_Y in the left/right direction calculated in steps S130 and steps S140. First, the torque control variable T_ST_1 is calculated based on the first risk potential R1_Y in the left/right direction attributed to the kinetic energy of the host vehicle. FIG. 6 shows the relationship between the first risk potential R1_Y in the left/right direction and the torque control variable T_ST_1. It is detected from the steering angle 6 whether host vehicle is turning right or left, and when the host vehicle is turning night, the torque control variable T_ST_1 increases in the positive direction as the first risk potential R1_Y in the left/right direction increases. When the host vehicle is turning left, the torque control variable T_ST_1 increases in the negative direction as the first risk potential R1_Y in the left/right direction increases.

Next, the torque control variable T_ST_2 is calculated based on the second risk potential R2_Y in the left/right direction attributed to the kinetic energy of the host vehicle. When the second risk potential R2_Y in the left/right direction is 0, the torque control variable T_ST_2 is set to 0. When the second risk potential R2_Y in the left/right direction is 1, i.e., when the road to the right is a road on which travel is not permitted, the torque control variable T_ST_2 is set to a prescribed value T1. When the second risk potential R2_Y in the left/right direction is −1, i.e., when the road to the left is a road on which travel is not permitted, the torque control variable T_ST_2 is set to a prescribed value −T1. The prescribed values T1 and −T1 are set to a value that allows the driver to clearly perceive a change in reaction force when T1 or −T1 is added to the steering torque.

The torque command value T_ST is calculated from the following Equation (2) on the basis of the torque command values T_ST_1 and T_ST_2.

$$T\_ST = T\_ST\_1 + T\_ST\_2 \qquad (2)$$

When the torque command value T_ST is a positive value, a steering reaction force is generated in the direction that returns the steering wheel 51 to the left, and when the value is negative, a steering reaction force is generated in the direction that returns the steering wheel 51 to the right.

Figure 7:
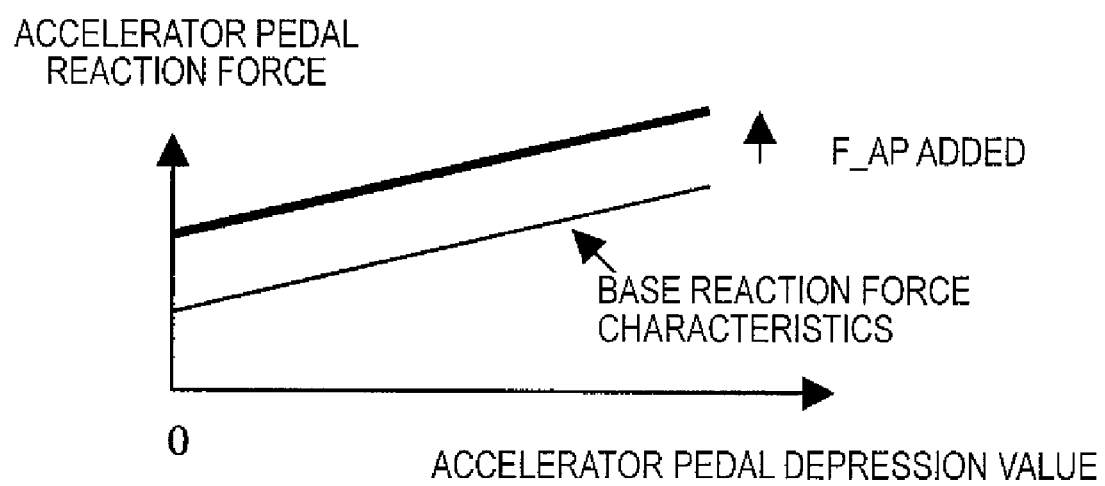
FIG. 7 is a diagram showing the operation reaction force generated in the accelerator pedal.

In the subsequent step S170, the accelerator pedal reaction force command value F_AP calculated in step S150 and the torque command value T_ST calculated in step S170 are outputted to the accelerator pedal reaction force generator 40 and the steering reaction force generator 50, respectively. The accelerator pedal reaction force generator 40 controls the servomotor in accordance with the reaction force command value F_AP inputted from the controller 30, and controls the operation reaction force generated when the driver operates the accelerator pedal 41. The value that results from adding the reaction force command value F_AP to the base reaction force characteristics that correspond to the accelerator pedal depression value is thereby generated as the accelerator pedal operation reaction force, as shown in FIG. 7.

Figure 8:
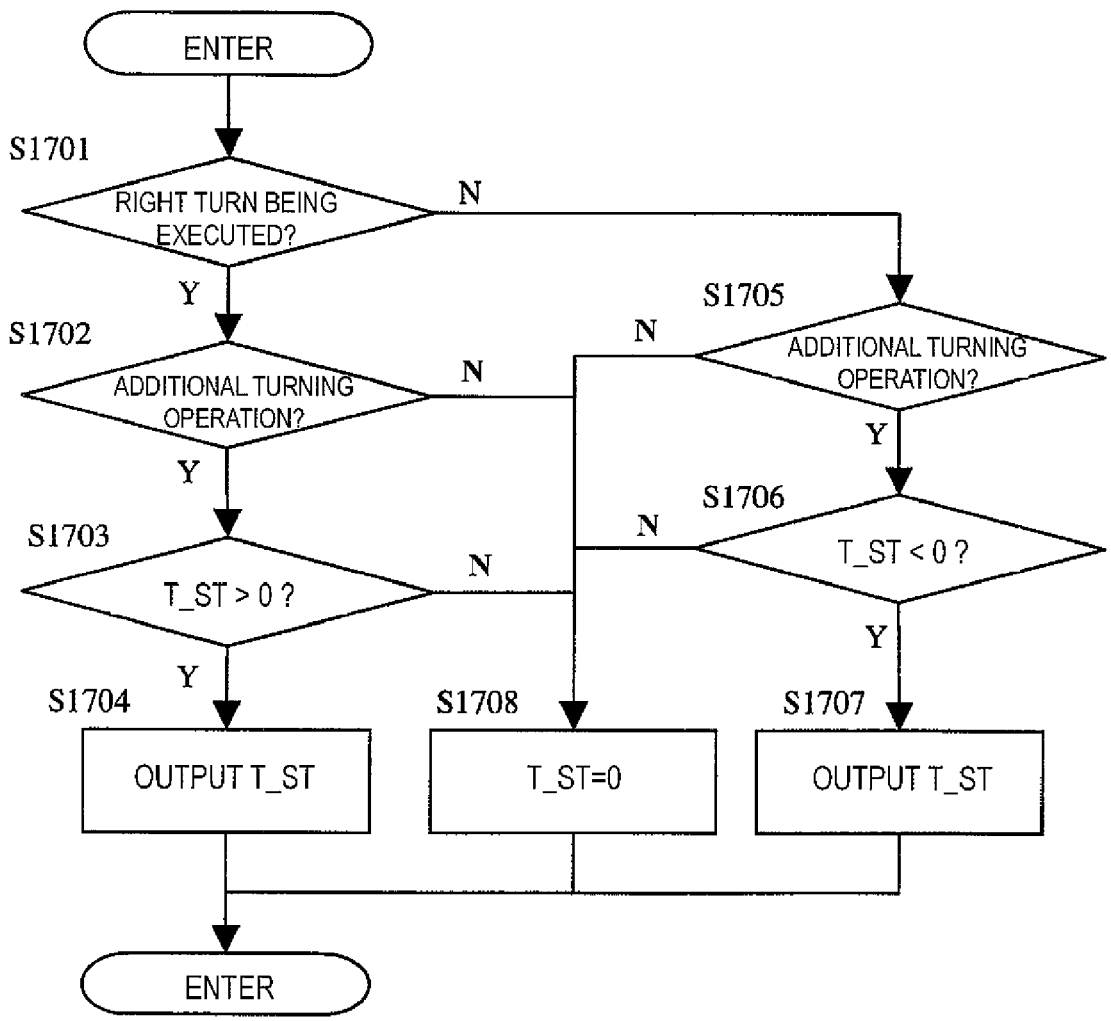
FIG. 8 is a flowchart showing the control processing steps executed for outputting the torque command value.

The steering reaction force generator 50 controls the servomotor in accordance with the torque command value T_ST inputted from the controller 30, and controls the steering reaction force generated when the drive steers the steering wheel 51. The processing sequence used when the controller 30 outputs the torque command value T_ST to the steering reaction force generator 50 will be described with reference to the flowchart of FIG. 8.

In step S1701, a determination is made based on the steering angle δ as to whether the host vehicle is being turned to the right. When a right turn is being made, the process advances to step S1702, and a determination is made as to whether the steering operation performed by the driver is additional steering in the right direction. When an additional steering operation is being carried out in the right direction, the process advances to step S1703 and a determination is made as to whether the torque command value T_ST calculated in step S160 is a positive value. When T_ST>0, the process advances to step S1704 and the torque command value T_ST is outputted to the steering reaction force generator 50.

A steering reaction force can thereby be added in the direction that returns the steering wheel 51 to the left when the driver has performed an additional steering operation in the right direction as the host vehicle is making a right turn. When the road resulting from the right turn is a road on which travel is not permitted, the steering reaction force is increased in a discontinuous manner in the direction that returns the steering wheel 51 to the left.

When a negative determination is made in step S1701, the process advances to step S1705, and a determination is made as to whether the steering operation performed by the driver is additional steering in the left direction. When an additional steering operation is being carried out in the left direction as the host vehicle is turning left, the process advances to step S1706. In step S1706, a determination is made as to whether the torque command value T_ST is a negative value. When T_ST<0, the process advances to step S1707 and the torque command value T_ST is outputted to the steering reaction force generator 50.

A steering reaction force can thereby be added in the direction that returns the steering wheel 51 to the right when the driver has performed an additional steering operation in the left direction as the host vehicle is making a left turn. When the road resulting from the left turn is a road on which travel is not permitted, steering reaction force is increased in a discontinuous manner in the direction that returns the steering wheel 51 to the right.

When a negative determination is made in steps S1702, S1703, S1705, and S1706, the process advances to step S1708, and the torque command value T_ST is corrected to 0 and outputted. A steering reaction force that corresponds to the risk potentials R1_Y and R2_Y in the left/right direction is thereby not generated when, for example, the host vehicle is traveling straight forward, when additional operation has not been performed, or in other cases. The current process is thereby ended.

Figure 9:
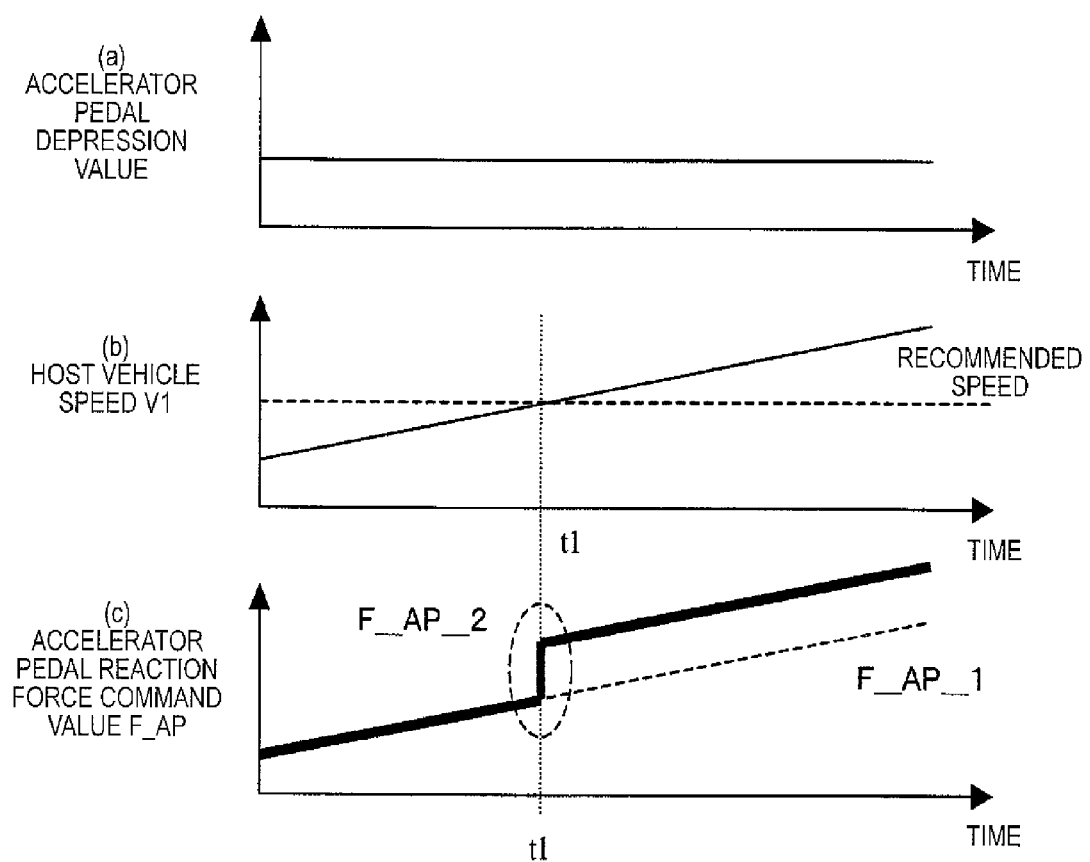
FIG. 9 is a series of diagrams showing examples of changes that occur over time in the depressed value of the accelerator pedal, the host vehicle speed, and the accelerator pedal reaction force command value.

The operation of the first embodiment is described below with reference to diagrams (a) to (c) of FIG. 9. In this description, the operation performed when the operation reaction force generated in the accelerator pedal 41 is controlled based on the risk potentials R1_X and R2_X in the forward/rearward direction is described as an example. Diagrams (a) to (c) of FIG. 9 show the changes that occur over time in the depressed value of the accelerator pedal, the host vehicle speed V1, and the accelerator pedal reaction force command value F_AP. When the accelerator pedal 41 is depressed in a substantially constant manner and the host vehicle speed V1 gradually increases, the first risk potential R1_X in the forward/rearward direction attributed to the kinetic energy of the host vehicle gradually increases, and the accelerator pedal reaction force command value F_A_P gradually increases as well. The accelerator pedal reaction force command value F_AP in this case is equal to the reaction force control variable F_AP_1 that corresponds to the first risk potential R1_X in the forward/rearward direction.

When the host vehicle speed V1 exceeds a recommended speed at time t1, a reaction force command value F_AP is generated. This value is obtained by a method in which the reaction force control variable F_AP_2 that corresponds to the second risk potential R2_X in the forward/rearward direction attributed to the travel rule of the host vehicle is added to the reaction force control variable F_AP_1 that corresponds to the first risk potential R1_X in the forward/rearward direction. The accelerator pedal operation reaction force is thereby increased in a discontinuous manner, and the driver can clearly be made aware from the instantaneous increase in the operation reaction force that the risk attributed to the travel rule has increased; specifically, that the host vehicle speed V1 has exceeded the recommended speed.

Thus, the first embodiment described above has the following effects.

First, the vehicle driving assist system 1 detects a plurality of risk factors related to the host vehicle, and calculates the first risk potential R1 attributed to a certain risk factor, and a second risk potential R2 attributed to another risk factor. The driver is notified of the risk potentials R1 and R2 using a single transmission device that distinctly notifies the driver of each of the risk potentials R1 and R2 in a distinct manner. The risk factors related to the host vehicle include potential risks that occur because of the vehicle travel condition, and other states of the host vehicle when the host vehicle is traveling, which are different from obstacles that are present in an area around the host vehicle and from other risk factors that are present in an area around the host vehicle. The different risks that occur due to the host vehicle is a factor can thereby be separately indicated to the driver.

Second, the vehicle driving assist system 1 detects a running state of the host vehicle and at least one of the host vehicle speed V1 and the lateral acceleration ay as the risk factors. The first risk potential R1 attributed to kinetic energy is calculated on the basis one of the host vehicle speed V1 and the lateral acceleration ay, and the second risk potential R2 attributed to the travel rule is also calculated. The first risk potential R1 is indicated to the driver via a continuous operation reaction force generated in the driver-operated driving operation device, and the second risk potential R2 is indicated to the driver via an operation reaction force that varies in a discontinuous manner and is generated in the driver-operated driving operation device. The driver-operated driving operation device used as risk transmission means is a device that the driver uses to drive and operate the host vehicle. In this case, the accelerator pedal 41 and steering wheel 51 are used. When the first risk potential R1 attributed to kinetic energy increases, damage will increase in a case in which an unforeseen situation occurs. Therefore, the driver can be effectively notified of the risk potential by the transmission of a continuous operation reaction force. The second risk potential R2 attributed to the travel rule is indicated using an operation reaction force that varies in a discontinuous manner, whereby the driver can clearly be made aware of a risk that is different than the first risk potential R1 attributed to kinetic energy.

Third, the controller 30 continuously increases the operation reaction force as the first risk potential R1 attributed to kinetic energy increases. The increase in the first risk potential R1 can be clearly indicated to the driver via the operation reaction force, and the driver can be urged to take appropriate driving actions.

Fourth, the travel rule acquisition section 20 detects whether the roads to the left and right are roads on which travel is not permitted as the travel rule. When the road to the right or left is a road on which travel is not permitted, the information can be reliably indicated to the driver via a discontinuous operation reaction force.

Fifth, the controller 30 determines that the second risk potential R2 attributed to the travel rule is high when the host vehicle is traveling in a manner that is not in accordance with the travel rule. When the second risk potential R2 is high, the operation reaction force is increased in a substantially stepwise fashion. Specifically, when the host vehicle speed V1 has exceeded the recommended speed acquired as a travel rule in relation to the forward and rearward direction of the vehicle, the operation reaction force generated by the accelerator pedal 41 is increased in a substantially stepwise fashion (non-gradual transition), as shown in FIG. 9C. In relation to the right and left directions of the vehicle, the operation reaction force generated in the steering wheel 51 is increased in a substantially stepwise fashion in cases in which a right turn is being made and the road to the right is a road on which travel is not permitted, or in cases in which a left is being made and the road to the left is a road on which travel is not permitted. The driver can readily be made aware that the host vehicle is traveling in a manner that is not in accordance with the travel rule when the operation reaction force is increased in a substantially stepwise fashion (non-gradual transition).

When the first risk potential R1_Y in the left/right direction attributed to the kinetic energy of the host vehicle is calculated, the lateral acceleration estimated based on the yaw rate θ, or the lateral acceleration estimated based on the yaw rate θ and the host vehicle speed V1, can be used in place of the lateral acceleration ay detected by a lateral acceleration sensor.

Second Embodiment

Figure 10:
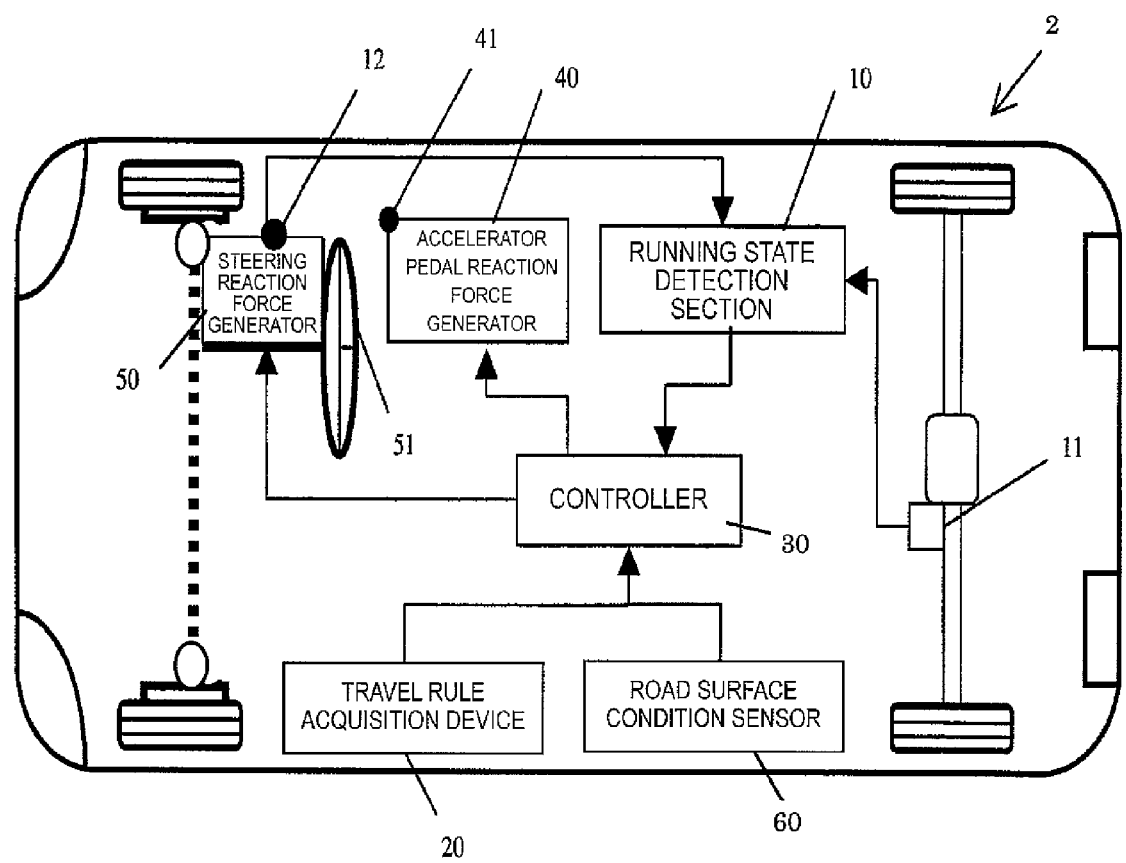
FIG. 10 is a simplified diagrammatic view of a vehicle in which the vehicle driving assist system is installed in accordance with a second embodiment of the present invention.
Figure 11:
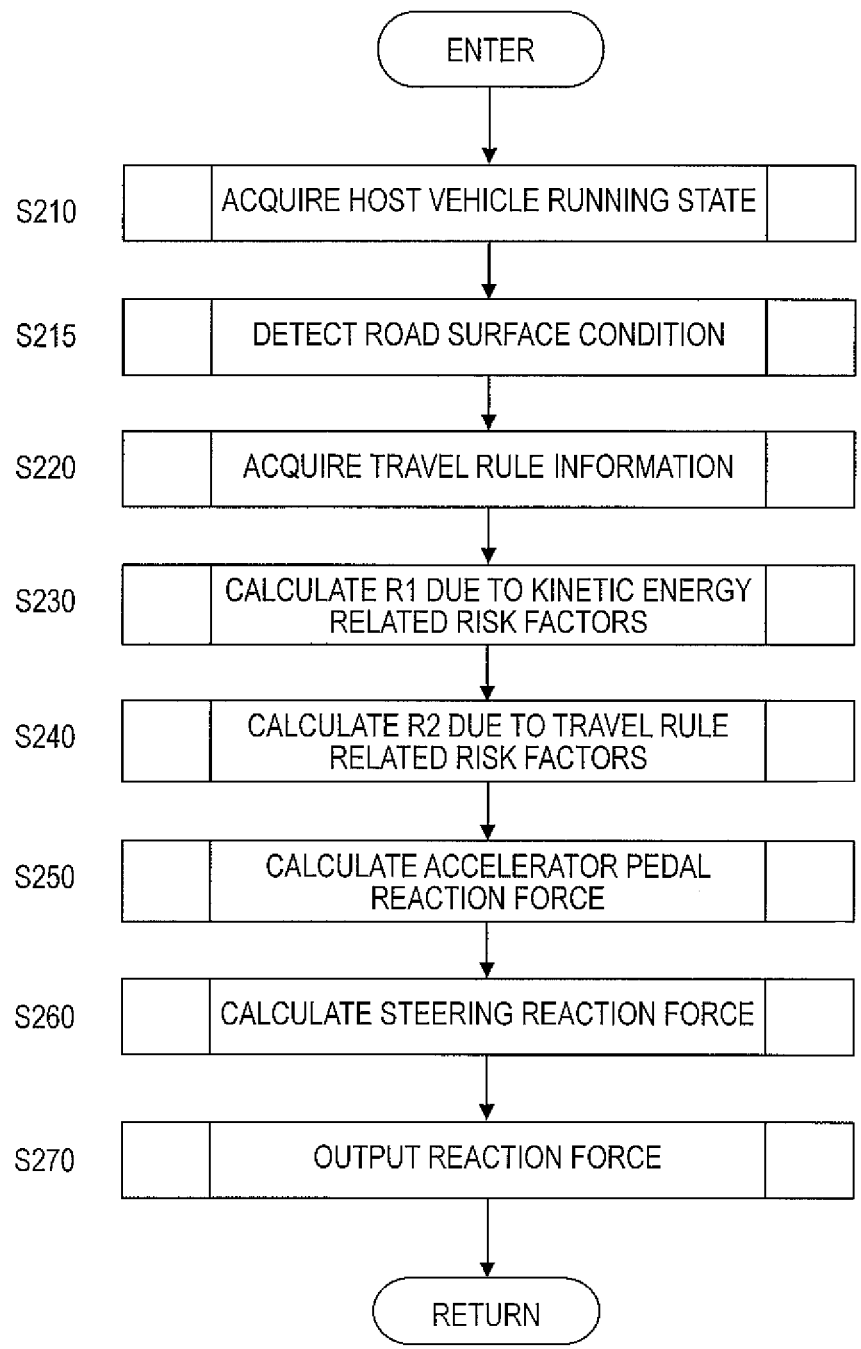
FIG. 11 is a flowchart showing control processing steps executed by a vehicle driving assist control program according to the second embodiment.

Referring now to FIGS. 10 and 11, a vehicle driving assist system 2 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. Thus, the points that differ from the first embodiment are mainly described below.

The vehicle driving assist system 2 is further provided with a road surface condition sensor 60 for detecting the condition of the road surface. The road surface condition sensor 60 is a device for detecting the condition of the road surface on the basis of the optical reflectivity of the road surface acquired by optical irradiation. The controller 30 evaluates the condition of the road surface acquired from the road surface condition sensor 60 and calculates the first risk potential R1 attributed to the kinetic energy of the host vehicle.

The operation of the vehicle driving assist system 2 according to the second embodiment is described in detail below with reference to FIG. 11. FIG. 11 is a flowchart showing a processing sequence for a vehicle driving assist control program executed by the controller 30. The processing steps are carried out in a continuous fashion at fixed intervals (50 msec, for example).

The host vehicle speed V1, the steering angle δ, the yaw rate θ, the lateral acceleration ay, and the forward/rearward acceleration ax are acquired by the vehicle running state detection section 10 in step S210. The host vehicle speed V1, the steering angle δ, the yaw rate θ, the lateral acceleration ay, and the forward/rearward acceleration ax are physical values representing the vehicle running state. In step S215, the condition of the road surface on which the host vehicle is traveling is detected by the road surface condition sensor 60. Specifically, the condition of the road surface is determined to correspond to one of the four following types.

a: Dry asphalt,
b: Wet road,
c: Snow-packed road, and
d: Icy road

In step S220, the travel rule acquisition section 20 acquires, as part of the travel rule, the non-obstacle related risk factors such as travel rule information related to the recommended speed for the road on which the host vehicle is traveling, and information related to roads on which travel is not permitted. Thus, information is obtained to formulate a travel rule, which can be composed of a single factor or multiple factors.

The first risk potential R1 attributed to the kinetic energy of the host vehicle is calculated in step S230. Specifically, the first risk potential R1_X in the forward/rearward direction related to the movement of the host vehicle in the forward and rearward directions is calculated based on the host vehicle speed V1 and the condition of the road surface, while the first risk potential R1_Y in the left/right direction related to movement in the left and right directions is calculated based on the lateral acceleration ay and the condition of the road surface.

Figure 12:
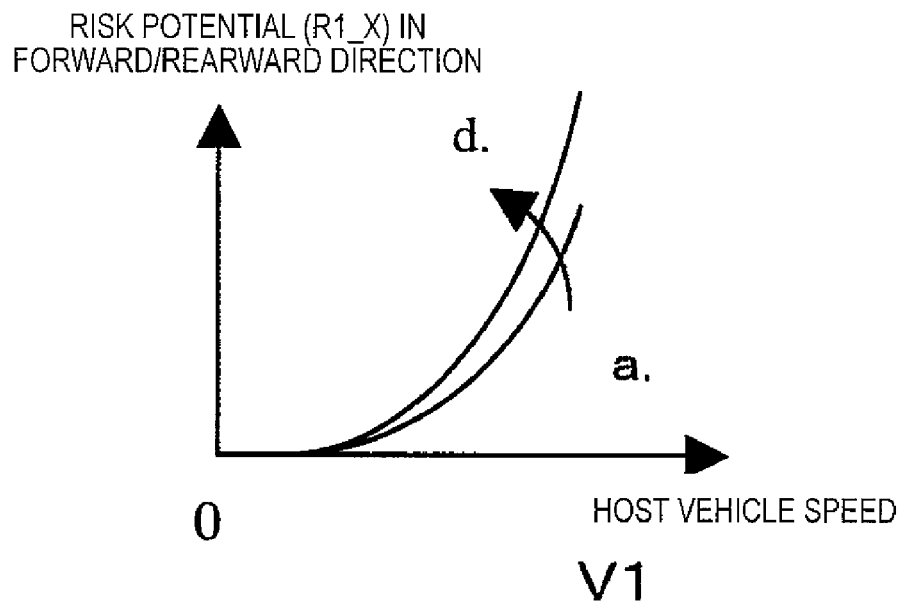
FIG. 12 is a diagram showing the relationship between the host vehicle speed and the risk potential in the forward/rearward direction attributed to kinetic energy.

In view of the above, the first risk potential R1_X in the forward/rearward direction based on the host vehicle speed V1, and the first risk potential R1_Y in the left/right direction based on the lateral acceleration ay, are calculated in accordance with the above-described FIGS. 3 and 4, respectively. In order to add the condition of the road surface to the calculation of the first risk potential R1, a risk compensation coefficient k is set in accordance with the condition of the road surface detected in step S215.

a: k=1.0, in the case of dry asphalt
b: k=1.2, in the case of a wet road
c: k=1.5, in the case of a snow-packed road
d: k=2.0, in the case of an icy road The first risk potential R1_X in the forward/rearward direction and risk potential R1_Y in the left/right direction are corrected by multiplication with the risk compensation coefficient k set in accordance with the condition of the road surface. FIG. 12 shows the relationship between the host vehicle speed V1 and the corrected risk potential R1_X in the forward/rearward direction. The first risk potential R1_X in the forward/rearward direction increases exponentially with increased host vehicle speed V1, i.e., increased kinetic energy in the forward/rearward direction. When the host vehicle speed V1 is the same, the first risk potential R1_X in the forward/rearward direction increases as the risk compensation coefficient k increases, i.e., as the condition of the road surface becomes more slippery, making it difficult to reduce speed.

Figure 13:
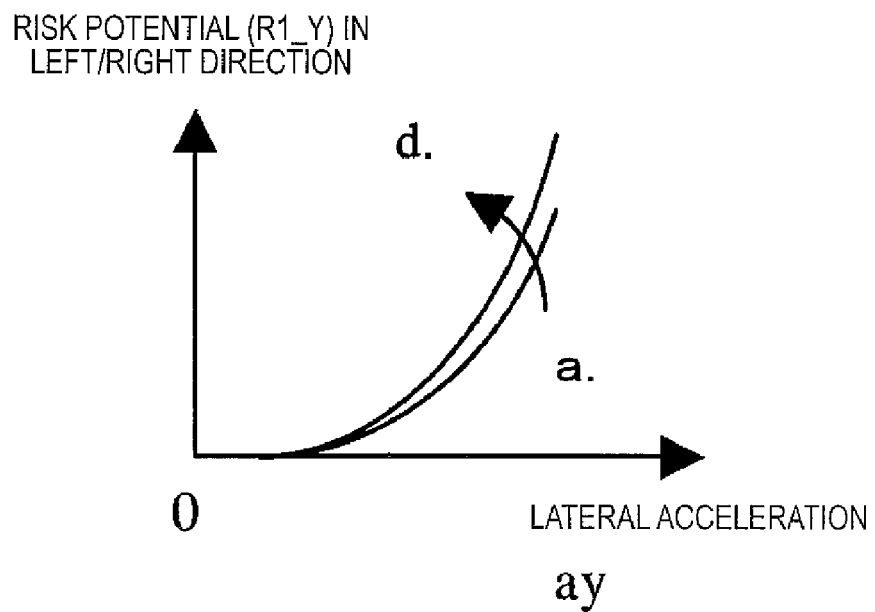
FIG. 13 is a diagram showing the relationship between lateral acceleration and the risk potential in the left/right direction attributed to kinetic energy.

FIG. 13 shows the relationship between the lateral acceleration ay (absolute value) and the corrected risk potential R1_Y in the left/right direction. The first risk potential R1_Y in the left/right direction increases exponentially with increased lateral acceleration ay increases, i.e., increased kinetic energy in the left/right direction. When the lateral acceleration ay is the same, the first risk potential R1_Y in the left/right direction increases as the risk compensation coefficient k increases, i.e., as the condition of the road surface becomes more slippery.

The processing carried out in steps S240 to S270 is the same as the processing carried out in steps S140 to S170 in the flowchart shown in FIG. 2, and a description will therefore be omitted. The reaction force control variable F_AP_1 and torque control variable T_ST_1 are calculated using the corrected risk potentials R1_X and R1_Y.

In this manner, the risk potentials R1_X and R1_Y attributed to kinetic energy can be corrected to be higher by taking the condition of the road surface into consideration when the road surface becomes more slippery, making it difficult to reduce speed. The operation reaction force generated in the accelerator pedal 41 and steering wheel 51 increases and the risk potentials R1_X and R1_Y attributed to kinetic energy can be more accurately brought to the attention of the driver.

Thus, the second embodiment described above has the following effects in addition to the effects obtained in the first embodiment described above.

The controller 30 corrects, in accordance with the condition of the road surface on which the host vehicle is traveling and which is detected by the road surface condition sensor 60, the operation reaction force that is continuously increased in accordance with the first risk potential R1 attributed to kinetic energy. Specifically, the risk potentials R1_X and R1_Y attributed to kinetic energy are corrected in accordance with the condition of the road surface, as shown in FIGS. 12 and 13. The operation reaction force can thereby be corrected so as to be increased and risks can be more effectively indicated when the road surface is more slippery and less amenable to deceleration.

In place of detecting the condition of the road surface using the road surface condition sensor 60 as a device for detecting the condition of the road surface, it is also possible for the vehicle to determine the condition of the road surface on the basis of the slip conditions of the wheels when the host vehicle is braking or being driven. Alternatively, an information service system can be provided at the side of the road or in another location to determine the condition of the road surface and to transmit the information to the vehicle.

Third Embodiment

Figure 14:
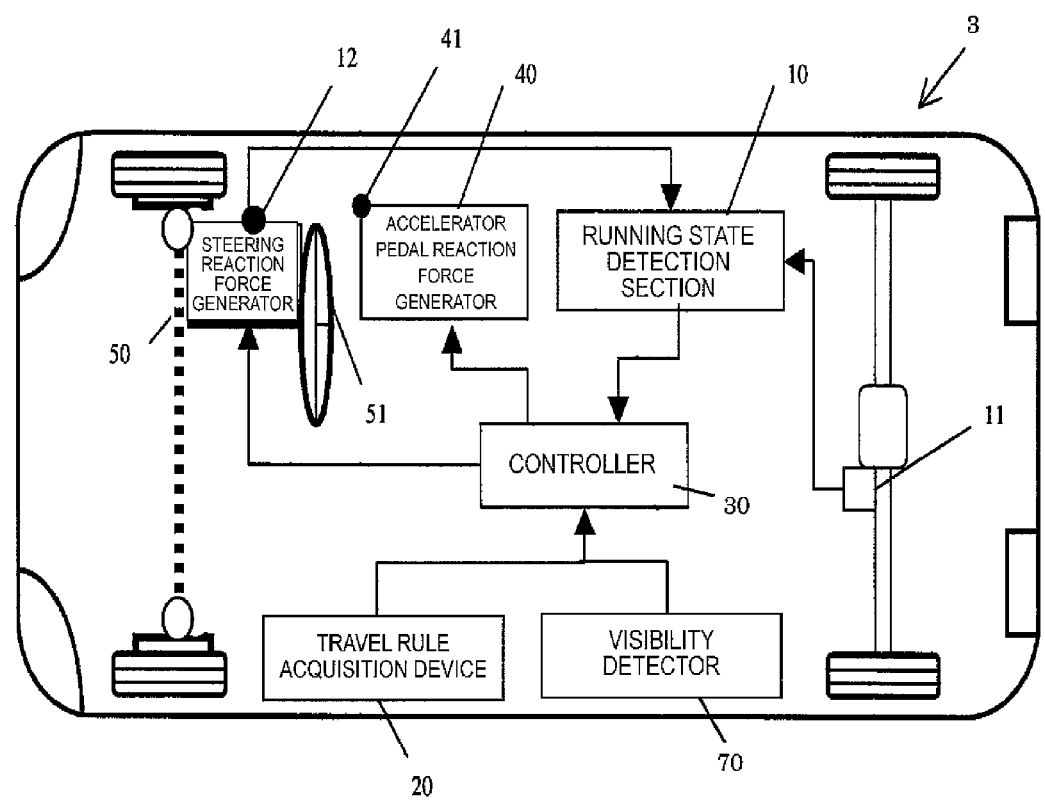
FIG. 14 is a simplified diagrammatic view of a vehicle in which the vehicle driving assist system is installed in accordance with a third embodiment of the present invention.
Figure 15:
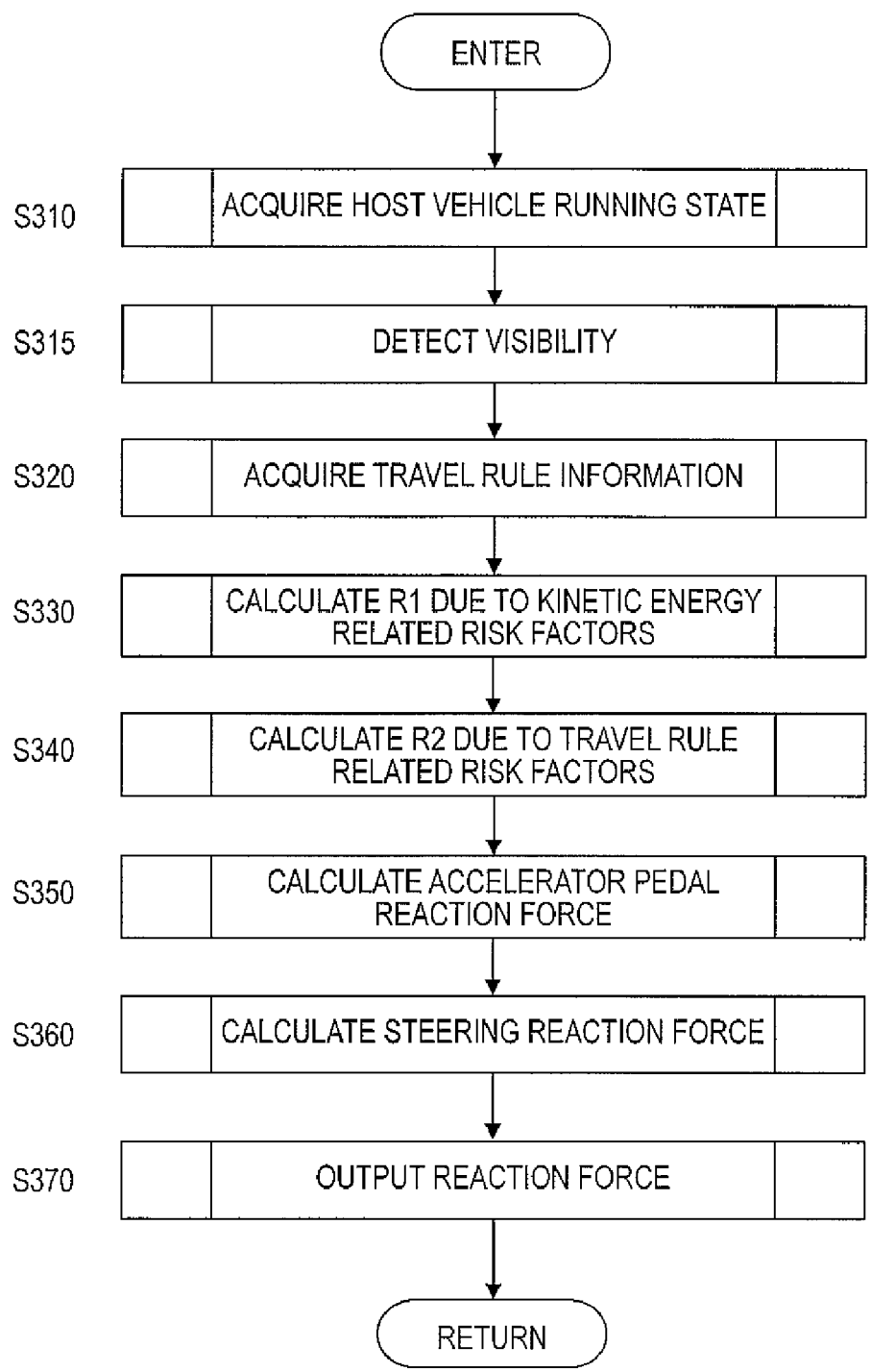
FIG. 15 is a flowchart showing the control processing steps executed by a vehicle driving assist control program according to the third embodiment.

Referring now to FIGS. 14 and 15, a vehicle driving assist system 3 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. Thus, the points that differ from the first embodiment are mainly described below.

The vehicle driving assist system 3 in the third embodiment is further provided with a visibility detector 70 for detecting visibility. The visibility detector 70 determines the quality of visibility on the basis of the lighted state of the headlights and the operating state of the windshield wipers. The controller 30 takes into consideration the visibility acquired from the visibility detector 70 and calculates the first risk potential R1 attributed to the kinetic energy of the host vehicle.

The operation of the vehicle driving assist system 3 according to the third embodiment is described in detail below with reference to FIG. 15. FIG. 15 is a flowchart showing a processing sequence for a vehicle driving assist control program in the controller 30. The processing steps are carried out in a continuous fashion at fixed intervals (50 msec, for example).

Figures 16, 17:
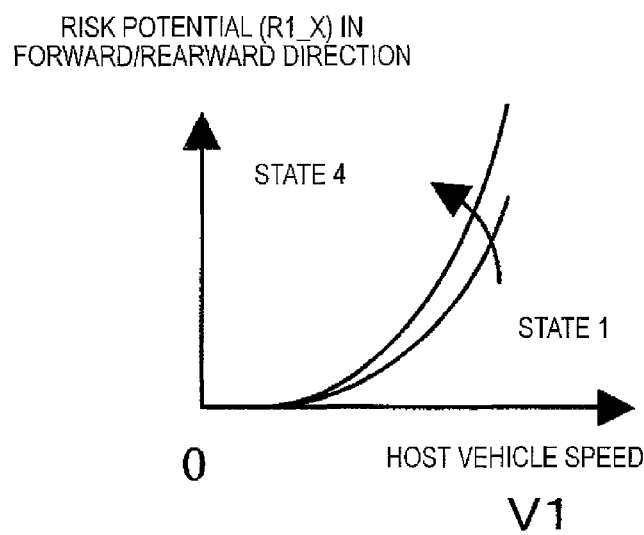
FIG. 16 is a chart that describes the method for determining visibility based on the operating state of the headlights and wipers.
FIG. 17 is a diagram showing the relationship between the host vehicle speed and the risk potential in the forward/rearward direction attributed to kinetic energy.

The host vehicle speed V1, the steering angle δ, the yaw rate θ, the lateral acceleration ay, and the forward/rearward acceleration ax are acquired by the vehicle running state detection section 10 in step S310. The host vehicle speed V1, the steering angle δ, the yaw rate θ, the lateral acceleration ay, and the forward/rearward acceleration ax are physical values representing the vehicle running state. In step S315, the visibility ahead of the host vehicle is detected by the visibility detector 70. Specifically, the quality of visibility is determined based on the lighted state of the headlights and the fog lights and on the operating state of the windshield wipers. FIG. 16 is a chart showing the visibility determined from the lighted state of the headlights and the fog lights and from the operating state of the windshield wipers.

In the case that the wipers are stopped or are operating intermittently, state 1 occurs during daytime travel or at other times when the headlights are not lighted, state 2 occurs during nighttime travel or at other times when the headlights are lighted, and state 3 occurs when fog or the like is present and the fog lights are lighted. In the case that the wipers are operating continuously, state 2 occurs when the headlights are not lighted, state 3 occurs when the headlights are lighted, and state 4 occurs when the fog lights are lighted. In the case that the wipers are operating at high speed, state 3 occurs when the headlights are not lighted, state 4 occurs when the headlights are lighted, and state 4 occurs when the fog lights are lighted. The sequence of states 1 to 4 represents degrees of worsening visibility.

In step S320, the travel rule acquisition section 20 acquires, as part of the travel rule, the non-obstacle related risk factors such as travel rule information related to the recommended speed for the road on which the host vehicle is traveling, and information related to roads on which travel is not permitted. Thus, information is obtained to formulate a travel rule, which can be composed of a single factor or multiple factors.

The first risk potential R1 attributed to the kinetic energy of the host vehicle is calculated in step S330. Specifically, the first risk potential R1_X in the forward/rearward direction related to the movement of the host vehicle in the forward and rearward directions is calculated based on the visibility and the host vehicle speed V1, and the first risk potential R1_Y in the left/right direction related to movement in the left and right directions is calculated based on the visibility and the lateral acceleration ay.

In view of the above, first, the first risk potential R1_X in the forward/rearward direction based on the host vehicle speed V1 and the first risk potential R1_Y in the left/right direction based on the lateral acceleration ay are calculated in accordance with the above-described FIGS. 3 and 4, respectively. In order to add visibility to the calculation of the first risk potential R1, a risk compensation coefficient k is set in accordance with the visibility detected in step S315.

a: k=1.0, in the case of good visibility
b: k=1.1, in the case of somewhat reduced visibility
c: k=1.2, in the case of low visibility
d: k=1.4, in the case of very low visibility The first risk potential R1_X in the forward/rearward direction and the first risk potential R1_Y in the left/right direction are corrected by multiplication with the risk compensation coefficient k set in accordance with the visibility. FIG. 17 shows the relationship between the host vehicle speed V1 and the corrected risk potential R1_X in the forward/rearward direction. The first risk potential R1_X in the forward/rearward direction increases exponentially with increased host vehicle speed V1, i.e., increased kinetic energy in the forward/rearward direction. When the host vehicle speed V1 is the same, the first risk potential R1_X in the forward/rearward direction increases with increased risk compensation coefficient k, i.e., reduced visibility.

Figure 18:
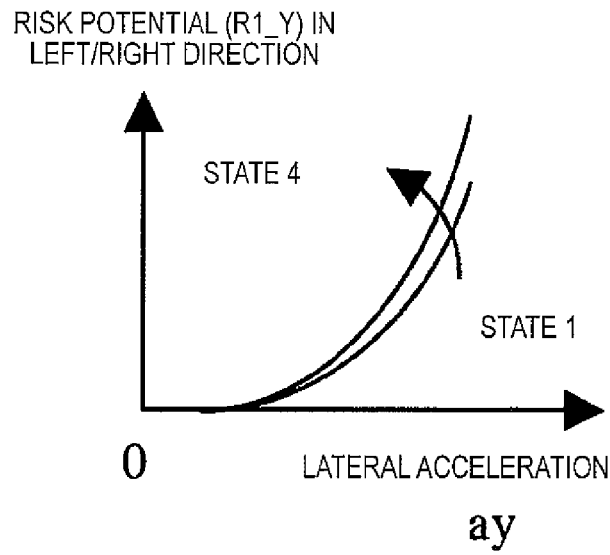
FIG. 18 is a diagram showing the relationship between the lateral acceleration and the risk potential in the left and right directions attributed to kinetic energy.

FIG. 18 shows the relationship between the lateral acceleration ay (absolute value) and the corrected risk potential R1_Y in the left/right direction. The first risk potential R1_Y in the left/right direction increases exponentially with increased lateral acceleration ay, i.e., increased kinetic energy in the left/right direction. When the lateral acceleration ay is the same, the first risk potential R1_Y in the left/right direction increases with increased risk compensation coefficient k, i.e., reduced visibility.

The processing carried out in steps S340 to S370 is the same as the processing carried out in steps S140 to S170 in the flowchart shown in FIG. 2, and a description will therefore be omitted. The reaction force control variable F_AP_1 and torque control variable T_ST_1 are calculated using the corrected risk potentials R1_X and R1_Y.

In this manner, the risk potentials R1_X and R1_Y attributed to kinetic energy can be corrected so as to be higher by taking visibility into consideration when the visibility is reduced and obstacles or the like are not quickly detected. The operation reaction force generated in the accelerator pedal 41 and steering wheel 51 increases and the risk potentials R1_X and R1_Y attributed to kinetic energy can be more accurately brought to the attention of the driver.

Thus, the third embodiment described above has the following effects in addition to the effects obtained in the first embodiment described above.

The controller 30 corrects, in accordance with the visibility ahead of the host vehicle detected by the visibility detector 70, the operation reaction force that is continuously increased in accordance with the first risk potential R1 attributed to kinetic energy. Specifically, the risk potentials R1_X and R1_Y attributed to kinetic energy are corrected in accordance with visibility, as shown in FIGS. 17 and 18. The operation reaction force is thereby corrected so as to be increased when visibility is reduced and obstacles or the like are not quickly detected, and risks can be more effectively indicated.

Visibility was determined using the lighted state of the headlights and the operating state of the wipers in the visibility detector 70 as a means for detecting visibility, but it is also possible for an information service system provided at the side of the road or in another location to determine visibility and to transmit fog information or other information to the vehicle.

Fourth Embodiment

A vehicle driving assist system 4 will now be explained in accordance with a fourth embodiment. The basic configuration of the vehicle driving assist system 4 according to the fourth embodiment is the same as in the first embodiment shown in FIG. 1. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. Thus, the points that differ from the first embodiment are mainly described below.

In the fourth embodiment, the first risk potential R1_X in the forward/rearward direction attributed to the kinetic energy of the host vehicle and the second risk potential R2_X in the left/right direction attributed to travel rule are calculated based on an upper speed limit of the speed limiter set by the driver himself. The speed limiter prevents acceleration above the prescribed upper speed limit, notifies the driver that the prescribed upper speed limit will be exceeded, and performs other tasks. In this case, the speed limiter is a system that notifies the driver that the host vehicle speed V1 will exceed the upper speed limit arbitrarily set by the driver.

The first risk potential R1_X in the forward/rearward direction attributed to kinetic energy substantially depends on the host vehicle speed V1, but the actual risk during travel is greatly affected not only by the host vehicle speed V1 but also by road width, amount of traffic, and other factors related to the traffic environment. The prescribed upper speed limit of the speed limiter is ordinarily set by the driver with consideration given to road width, amount of traffic, and other factors. In view of this situation, the upper speed limit set by the driver himself is used in the fourth embodiment, and the first risk potential R1_X in the forward/rearward direction is set so as to increase when the prescribed upper speed limit is approached.

Figure 19:
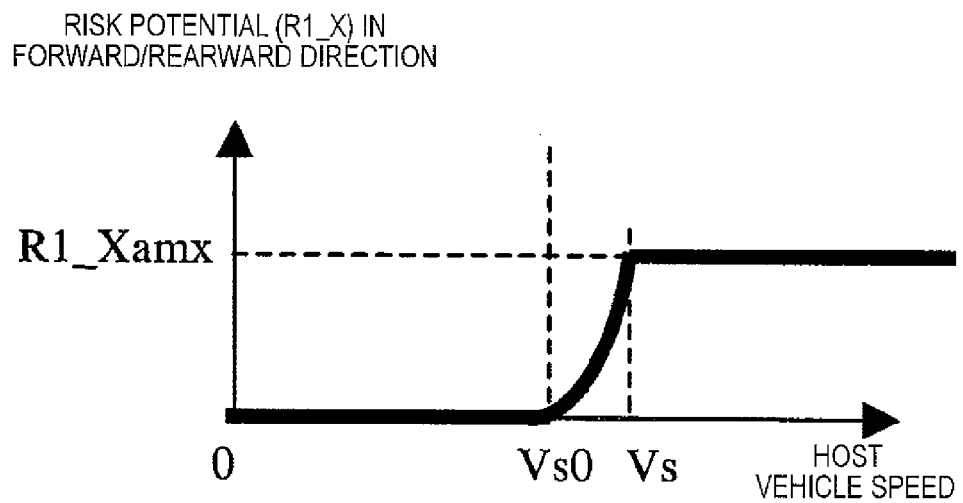
FIG. 19 is a diagram showing the relationship between the host vehicle speed and the risk potential in the forward/rearward direction attributed to kinetic energy in a fourth embodiment.

FIG. 19 shows the relationship between the host vehicle speed V1 and the first risk potential R1_X in the forward/rearward direction attributed to the kinetic energy of the host vehicle. The term Vs is the upper speed limit set by the driver. The first risk potential R1_X is set to 0 when the host vehicle speed V1 is equal to or less than a prescribed value Vs0. In this case, the prescribed value Vs0 is the threshold value for determining whether to notify the driver that the host vehicle speed V1 is approaching the prescribed upper speed limit Vs or whether to notify the driver of the risk attributed to the kinetic energy of the host vehicle. The value can, for example, be set to about 90% of the prescribed upper speed limit Vs. When the host vehicle speed V1 will exceed the prescribed value Vs0, the first risk potential R1_X in the forward/rearward direction is gradually, e.g., exponentially, increased to reach the maximum value R1_Xmax at the prescribed upper speed limit Vs. The first risk potential R1_X in the forward/rearward direction is fixed at the maximum value R1_Xmax when the host vehicle speed V1 is at or above the prescribed upper speed limit Vs.

When the host vehicle speed V1 has exceeded the prescribed upper speed limit Vs, it is determined that the risk is high and the second risk potential R2_X in the forward/rearward direction attributed to the travel rule of the host vehicle is set to 1. When the host vehicle speed V1 is equal to or less than the prescribed upper speed limit Vs, it is determined that the risk low and R2_X is set to 0.

Thus, the reaction force control variable F_AP_1 and the torque control variable T_ST_1 are calculated using the risk potentials R1_X, R2_X in the forward/rearward direction, which were calculated using the prescribed upper speed limit Vs. The first risk potential R1_Y in the left/right direction attributed to the kinetic energy of the host vehicle, and the second risk potential R2_Y in the left/right direction attributed to the travel rule, are calculated in the same manner as in the first embodiment.

Thus, the fourth embodiment described above has the following effects in addition to the effects obtained in the first to third embodiments described above.

The travel rule acquisition section 20 acquires the prescribed upper speed limit Vs, as part of the travel rule, from a speed limiter (upper speed limit notification section) for notifying the driver that the host vehicle will exceed the prescribed upper speed limit Vs set by the driver. The controller 30 increases the first risk potential R1_X attributed to kinetic energy as the host vehicle speed V1 increases and approaches the prescribed upper speed limit Vs (see FIG. 19). The actual risk incurred when the host vehicle is traveling is greatly affected by the road width, amount of traffic, and other factors related to the traffic environment. The basis is the prescribed upper speed limit Vs set by the driver himself with consideration given to the traffic environment and other factors, and the first risk potential R1_X can thereby be calculated in accordance with the risk perceived by the driver.

Figure 20:
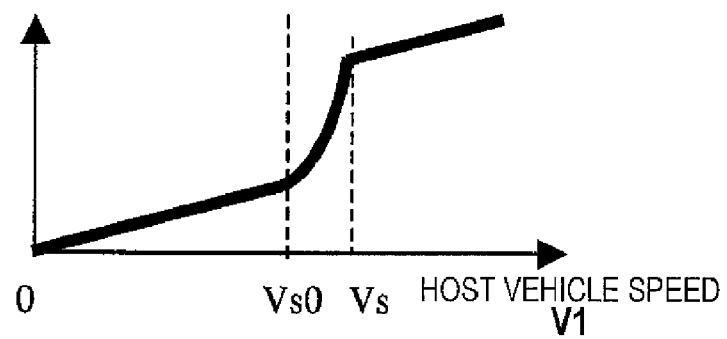
FIG. 20 is a diagram showing the relationship between the host vehicle speed and the risk potential in the forward/rearward direction attributed to kinetic energy in accordance with a modified example of the fourth embodiment.

In this configuration, the first risk potential R1_X in the forward/rearward direction attributed to kinetic energy is calculated based on the host vehicle speed V1 and the prescribed upper speed limit Vs. FIG. 20 shows the relationship between the host vehicle speed V1 and the first risk potential R1_X in the forward/rearward direction. The first risk potential R1_X in the forward/rearward direction increases with increased host vehicle speed V1. When the host vehicle speed V1 will exceed the prescribed value Vs0, the first risk potential R1_X in the forward/rearward direction increases exponentially, and when the prescribed upper speed limit Vs is exceeded, the first risk potential R1_X in the forward/rearward direction increases again in association with the increase in the host vehicle speed V1.

The first risk potential R1_X in the forward/rearward direction attributed to kinetic energy calculated in this situation corresponds to a value obtained by adding the risk potential that is increased when the prescribed upper speed limit Vs is approached to the risk potential that is increased in association with the increased host vehicle speed V1. The increase in the first risk potential R1_X in the forward/rearward direction produced by the increase in the host vehicle speed V1 is thereby continuously indicated to the driver. At the same time, the risk is emphasized and indicated when the prescribed upper speed limit Vs is approached. Therefore, the driver can be more effectively notified of risks.

Fifth Embodiment

A vehicle driving assist system will now be explained in accordance with a fifth embodiment. The basic configuration of the vehicle driving assist system according to the fifth embodiment is the same as in the first embodiment shown in FIG. 1. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity. Thus, the points that differ from the first embodiment are mainly described below.

The first risk potential R1_X in the forward/rearward direction attributed to kinetic energy substantially depends on the host vehicle speed V1. The risk during actual travel is affected not only by the host vehicle speed V1 but also the traffic environment, e.g., the type of road. The speed limit of side streets, residential roads that run through residential areas, and other roads is set to low in comparison with highways and expressways. In the fifth embodiment, the first risk potential R1_X in the forward/rearward direction attributed to the kinetic energy of the host vehicle is calculated so that a sensation of risk suitable for the travel environment is indicated to the driver when traveling residential roads in particular.

Figure 21:
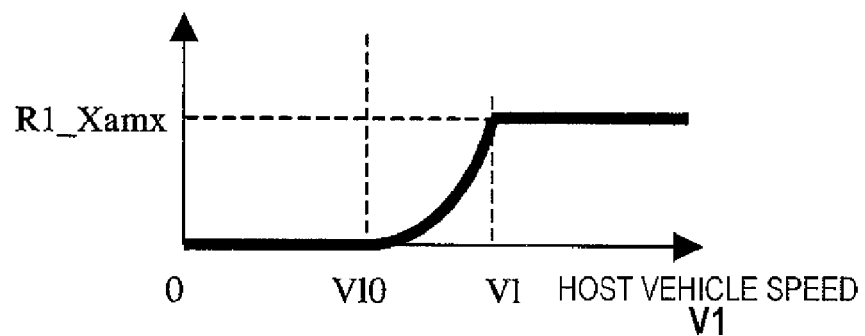
FIG. 21 is a diagram showing the relationship between the host vehicle speed and the risk potential in the forward/rearward direction attributed to kinetic energy in a fifth embodiment.

FIG. 21 shows the relationship between the host vehicle speed V1 and the first risk potential R1_X in the forward/rearward direction attributed to the kinetic energy of the host vehicle. The term V1 is the upper speed limit recommendation as the speed of the host vehicle when a residential road is being traveled. The upper speed limit V1 is set to about, e.g., 35 km/h, using the speed limit of the residential road as a reference. R1_X is set to 0 when the host vehicle speed V1 is a prescribed value V10 or less. In this case, the prescribed value V10 is set to a low vehicle speed, e.g., V10=10 km/h. When the host vehicle speed V1 exceeds the prescribed value V10, the first risk potential R1_X in the forward/rearward direction gradually, e.g., exponentially, increases and reaches the maximum value R1_Xmax at the upper speed limit V1. At the upper speed limit V1 or higher, the maximum value R1_Xmax is fixed.

Thus, the fifth embodiment described above has the following effects in addition to the effects obtained in the first to third embodiments described above.

The travel rule acquisition section 20 acquires, as a part of the travel rule, the host vehicle speed V1 recommended as the speed of the host vehicle when a residential road is being traveled. The controller 30 increases the first risk potential R1_X attributed to kinetic energy as the host vehicle speed V1 increases and approaches the upper speed limit V1 (see FIG. 21). The actual risk incurred when the host vehicle is traveling is greatly affected by the road width, amount of traffic, and other factors related to the traffic environment. When the host vehicle is traveling on a residential road, the first risk potential R1_X suitable for the traffic environment can thereby be calculated using as a reference an upper speed limit V1 that is suitable for traveling on a residential road.

Figure 22:
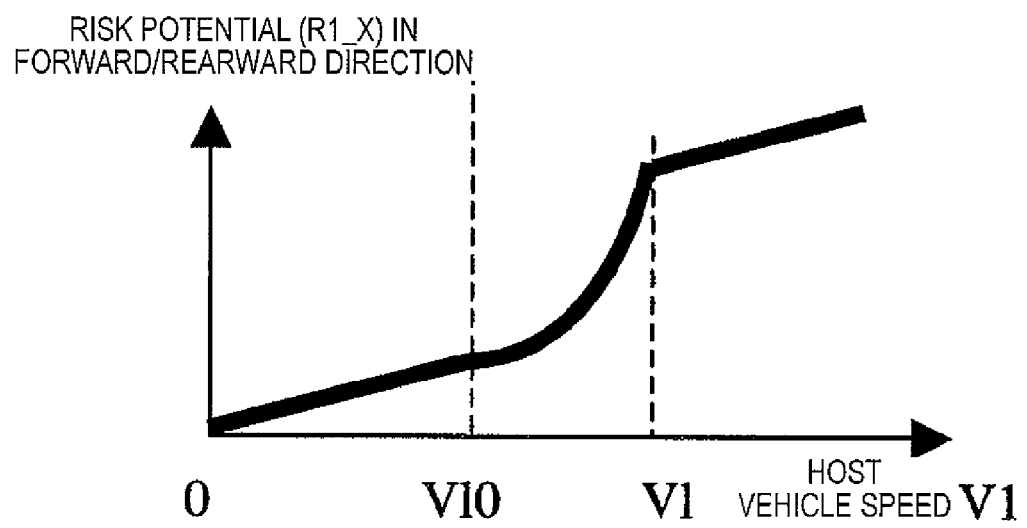
FIG. 22 is a diagram showing the relationship between the host vehicle speed and the risk potential in the forward/rearward direction attributed to kinetic energy in a modified example of the fifth embodiment.

In this configuration, the first risk potential R1_X in the forward/rearward direction attributed to kinetic energy is calculated based on the host vehicle speed V1 and the type of road. FIG. 22 shows the relationship between the host vehicle speed V1 and the first risk potential R1_X in the forward/rearward direction. The first risk potential R1_X in the forward/rearward direction increases with increased host vehicle speed V1. When the host vehicle speed V1 exceeds the prescribed value V10, the first risk potential R1_X in the forward/rearward direction increases exponentially, and when the upper speed limit V1 is exceeded, the first risk potential R1_X in the forward/rearward direction increases again in association with the increase in the host vehicle speed V1.

The first risk potential R1_X in the forward/rearward direction attributed to kinetic energy calculated in this situation corresponds to a value obtained by a method in which the risk potential that is determined taking the road type into consideration and is increased when the upper speed limited V1 is approached is added to the risk potential that is increased in association with the increased host vehicle speed V1. The increase in the first risk potential R1_X in the forward/rearward direction produced by the increase in the host vehicle speed V1 is thereby continuously indicated to the driver. At the same time, the risk is emphasized and indicated when the upper speed limit V1 is approached. Therefore, the driver can be more effectively notified of risks.

Sixth Embodiment

A vehicle driving assist system will now be explained in accordance with a sixth embodiment. The basic configuration of the vehicle driving assist system according to the sixth embodiment is the same as in the first embodiment shown in FIG. 1. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity. Thus, the points that differ from the first embodiment are mainly described below.

In the sixth embodiment, the reaction force control variable F_AP_1 that corresponds to the first risk potential R1_X in the forward/rearward direction attributed to the kinetic energy of the host vehicle is added to the accelerator pedal 41. When a further downward pressure on the accelerator pedal 41 by the driver is detected, the second risk potential R2_X in the forward/rearward direction attributed to the travel rule of the host vehicle is indicated to the driver.

Figure 23:
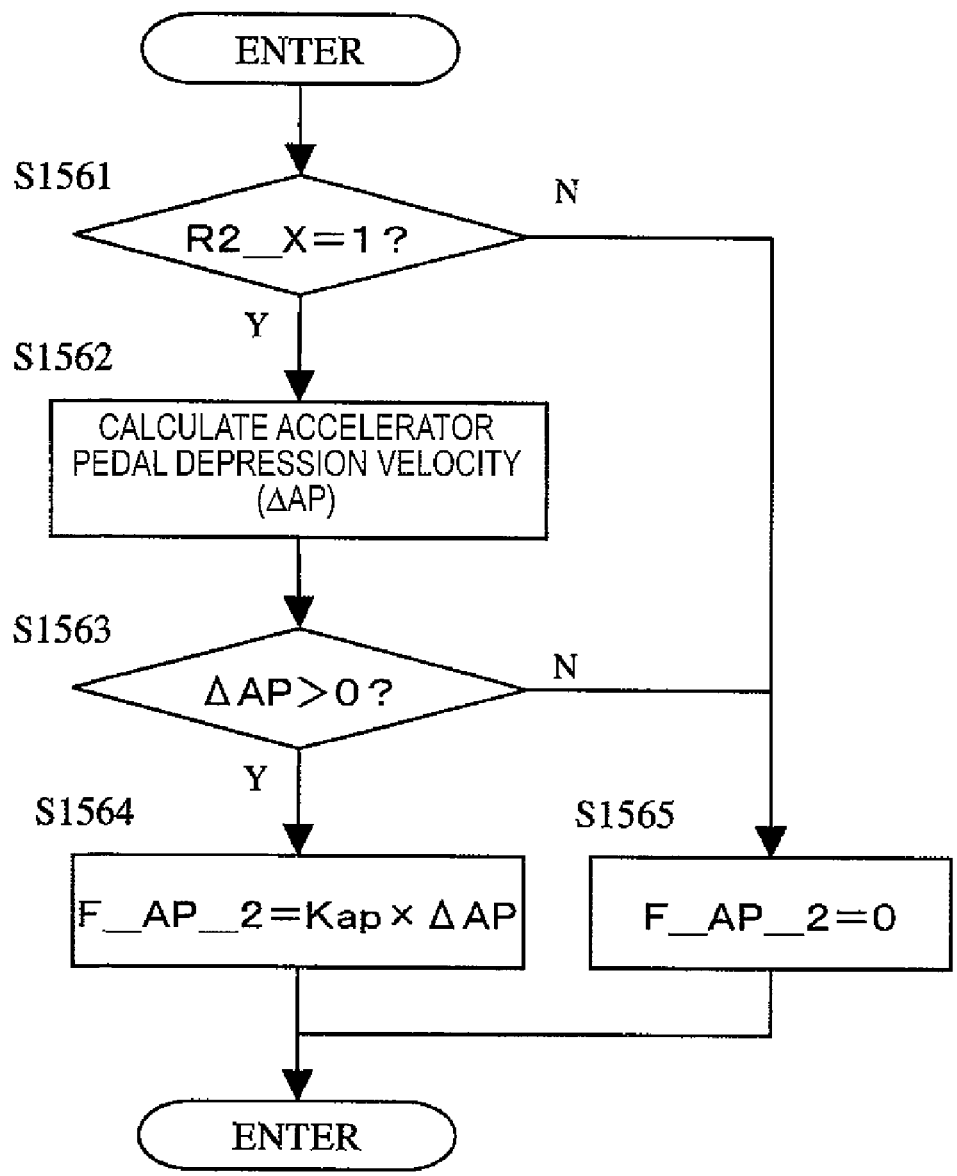
FIG. 23 is a flowchart showing the control processing steps executed for calculating the reaction force control variable in a sixth embodiment.

The reaction force control variable F_AP_1 is calculated based on the first risk potential R1_X in the forward/rearward direction in association with the map shown in FIG. 5 described above. The method for calculating the reaction force control variable F_AP_2, which is based on the second risk potential R2_X in the forward/rearward direction, will be described with reference to the flowchart of FIG. 23.

In step S1561, a determination is made as to whether the second risk potential R2_X in the forward/rearward direction attributed to the travel rule is equal to 1. When the second risk potential R2_X=1 and the host vehicle speed V1 has exceeded the recommended speed, the process advances to step S1562. The accelerator pedal depression velocity ΔAP is calculated in step S1562. The accelerator pedal depression velocity ΔAP can be calculated by the time differentiation of the depressed value of the accelerator pedal 41 detected by, e.g., an accelerator pedal stroke sensor (not shown).

In step S1563, a determination is made as to whether the accelerator pedal depression velocity ΔAP calculated in step S1562 is greater than 0. When ΔAP>0, i.e., when the accelerator pedal 41 has been further depressed, the process advances to step S1564 and the reaction force control variable F_AP_2 is calculated from the following Equation (3).

$$F\_AP\_2 = Kap \times \Delta AP \tag{3}$$

The term Kap is a control constant that is suitably set in advance as a value that will impart to the accelerator pedal 41 a sufficient change in reaction force in accordance with the accelerator pedal depression velocity ΔAP.

When a negative determination is made in step S1561 and the second risk potential R2_X in the forward/rearward direction is set to 0, or when a negative determination is made in step S1563 and the accelerator pedal 41 has not been depressed further, the process advances to step S1565 and the reaction force control variable F_AP_2 is set to 0.

Figure 24:
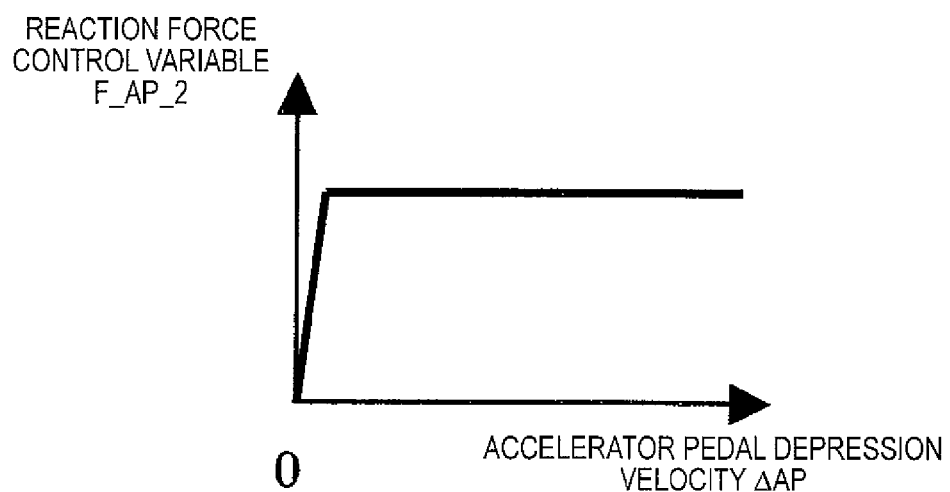
FIG. 24 is a diagram showing the relationship between the depression velocity of the accelerator pedal and the control value of the reaction force.

In this manner, in the case that the host vehicle speed V1 has exceeded the recommended speed (R2_X=1), the reaction force control variable F_AP_2 is calculated in accordance with the operation velocity ΔAP of the accelerator pedal 41 when the accelerator pedal 41 is further depressed, as shown in FIG. 24. When the driver attempts to further depress the accelerator pedal 41 in a state in which the host vehicle speed V1 has exceeded the recommended speed, additional reaction force based on the kinetic energy is thereby applied and operation reaction force can be generated so that the accelerator pedal 41 becomes very stiff.

Thus, the sixth embodiment described above has the following effects in addition to the effects obtained in the first to fifth embodiments described above.

The controller 30 determines that the second risk potential R2 attributed to the travel rule is high when the host vehicle is traveling in a manner that is not in accordance with the travel rule. When the second risk potential R2 is high, the operation reaction force is increased in accordance with the operation speed of the driver-operated driving operation device. Specifically, the depression velocity ΔAP of the accelerator pedal 41 is calculated, and the reaction force control variable F_AP_2 is also calculated so as to increase with increased accelerator pedal depression velocity ΔAP, as shown in FIG. 24. When the accelerator pedal 41 is rapidly depressed in a state in which the travel rule is not being followed, the accelerator pedal 41 becomes very stiff and the driver can be clearly made aware that the second risk potential R2_X in the forward/rearward direction attributed to the travel rule is high.

Seventh Embodiment

A vehicle driving assist system will now be explained in accordance with a seventh embodiment. The basic configuration of the vehicle driving assist system according to the seventh embodiment is the same as in the first embodiment shown in FIG. 1. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity. Thus, the points that differ from the first embodiment are mainly described below.

In the seventh embodiment, the risk potentials R1_X and R2_X in the forward/rearward direction and the risk potentials R1_Y and R2_Y in the left/right direction are indicated to the driver by using vibrations that are generated from the accelerator pedal 41 and the steering wheel 51. Specifically, the driver can be made aware of the magnitude and type of the risk potentials R1_X, R2_X, R1_Y, and R2_Y by using the frequency of the vibrations. In the seventh embodiment, vibrations are generated from the accelerator pedal 41 and the steering wheel 51 by generating a vibrating reaction force, i.e., producing a reaction force periodically varying in magnitude, in the accelerator pedal reaction force generator 40 and the steering reaction force generator 50.

First, the method for calculating the frequency of the vibrations to be generated in the accelerator pedal 41 will be described.

Figure 25:
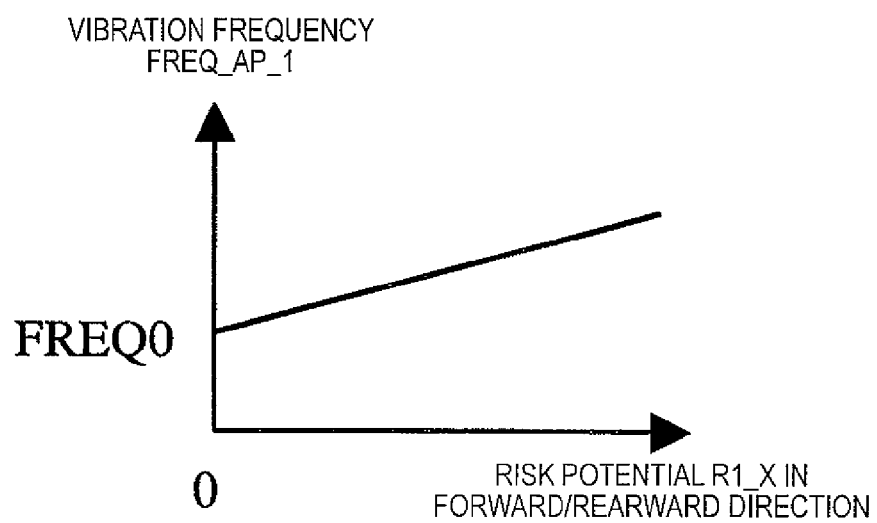
FIG. 25 is a diagram showing the relationship between the vibration frequency and the risk potential in the forward/rearward direction attributed to kinetic energy in a seventh embodiment.

As an example of such calculations, the vibration frequencies FREQ_AP_1 and FREQ_AP_2 are calculated using the risk potentials R1_X and R2_X in the forward/rearward direction, which are based on the established speed limit Vs calculated in the fourth embodiment described above. FIG. 25 shows the relationship between the vibration frequency FREQ_AP_1 and the first risk potential R1_X in the forward/rearward direction attributed to kinetic energy. The vibration frequency FREQ_AP_1 gradually increases from the initial value FREQ0 as the first risk potential R1_X in the forward/rearward direction increases, as shown in FIG. 25.

The vibration frequency FREQ_AP_2 is set to 0 when the second risk potential R2_X in the forward/rearward direction attributed to the travel rule is equal to 0, and the vibration frequency FREQ_AP_2 is set to FREQ1 when the second risk potential R2_X in the forward/rearward direction=1. The prescribed FREQ1 is set to a higher frequency value than the upper-limit value that can be assumed by the vibration frequency FREQ_AP_1 calculated in accordance with FIG. 25. Next, a comparison is drawn between the vibration frequency FREQ1 based on the first risk potential R1_X in the forward/rearward direction attributed to kinetic energy, and the vibration frequency FREQ2 based on the second risk potential R2_X in the forward/rearward direction attributed to kinetic energy, and the value of the higher frequency of the two is selected as the frequency command value FREQ_AP.

Next, the method for calculating the frequency of the vibrations to be generated in the steering wheel 51 will be described.

Figure 26:
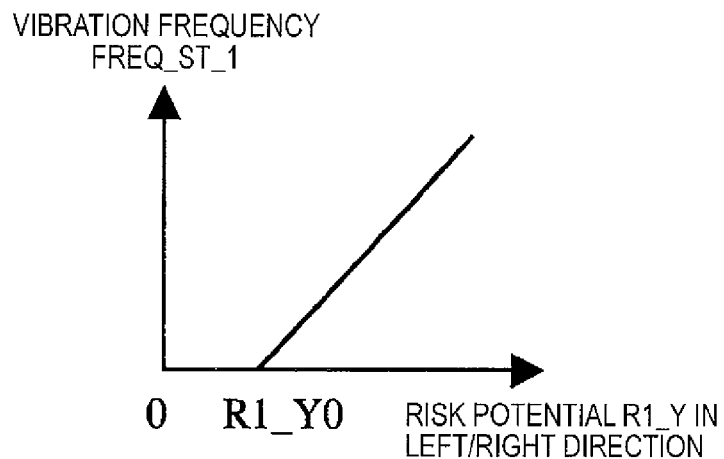
FIG. 26 is a diagram showing the relationship between the vibration frequency and the risk potential in the left/right direction attributed to kinetic energy.

As an example of such calculations, the vibration frequencies FREQ_ST_1 and FREQ_ST_2 are calculated using the risk potentials R1_Y and R2_Y in the left/right direction calculated in the first embodiment described above. FIG. 26 shows the relationship between the vibration frequency FREQ_ST_1 and the first risk potential R1_Y in the left/right direction attributed to kinetic energy. The vibration frequency FREQ_ST_1 gradually increases as the first risk potential R1_Y in the left/right direction increases beyond a prescribed value R1_Y0, as shown in FIG. 26.

The vibration frequency FREQ_ST_2 is set to 0 when the second risk potential R2_Y in the left/right direction attributed to a travel rule is equal to 0, and the vibration frequency FREQ_ST_2 is set to FREQ2 when the second risk potential R2_Y in the left/right direction=1 or −1. The prescribed FREQ2 is set to a higher frequency value than the upper-limit value that can be assumed by the vibration frequency FREQ_ST_1 calculated in accordance with FIG. 26.

Figure 27:
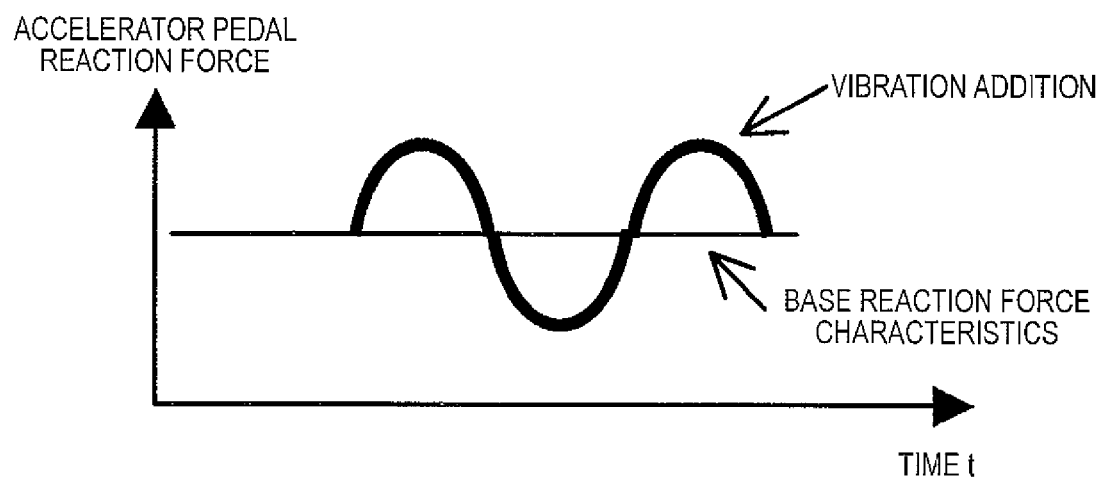
FIG. 27 is a diagram showing changes that occur over time in the operation reaction force generated in the accelerator pedal.

The vibrating reaction force calculated based on the risk potentials R1_X and R2_X in the forward/rearward direction, i.e., the frequency command value FREQ_AP, is outputted to the accelerator pedal reaction force generator 40. The accelerator pedal reaction force generator 40 controls the servomotor in accordance with the frequency command value FREQ_AP, and an operation reaction force to which a periodically varying additional reaction force has been added in the manner shown in FIG. 27 is generated in the accelerator pedal 41.

Figure 28:
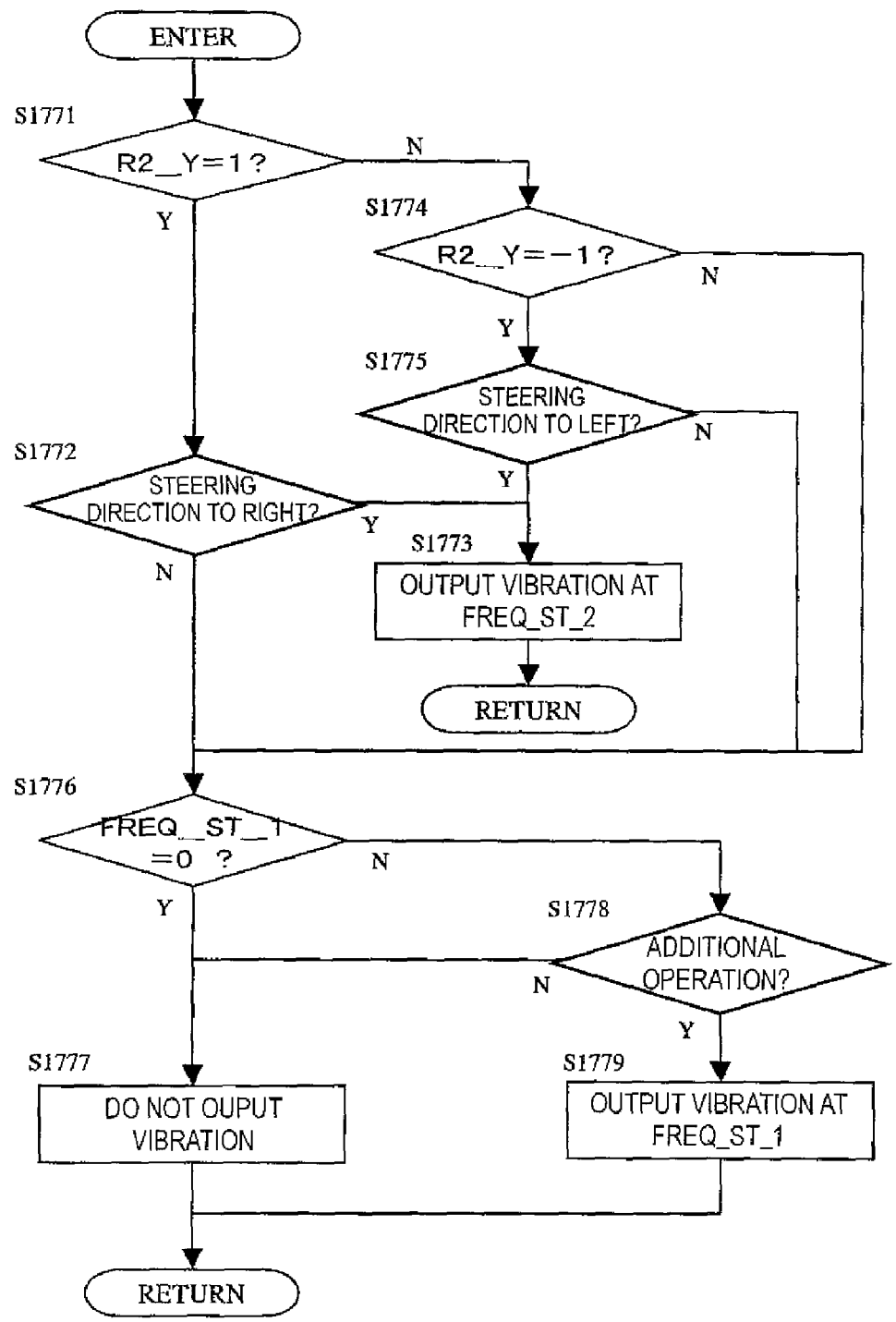
FIG. 28 is a flowchart showing the control processing steps executed for processing the vibration frequency output to a steering reaction force generator.

The vibration frequencies FREQ_ST_1 and FREQ_ST_2 calculated based on the risk potentials R1_Y and R2_Y in the left/right direction are output to the steering reaction force generator 50. The method for outputting the vibration frequencies FREQ_ST_1 and FREQ_ST_2 are described below with reference to the flowchart of FIG. 28.

In step S1771, a determination is made as to whether the second risk potential R2_Y in the left/right direction attributed to the travel rule is equal to 1. When R2_Y=1 and the road to the right is a road on which travel is not permitted, the process advances to step S1772 and a determination is made as to whether the steering wheel 51 has been turned from the steering angle 6 in the night direction. When the steering direction is the right direction, the process advances to step S1773 and the vibration frequency FREQ_ST_2 calculated in accordance with the second risk potential R2_Y in the left/right direction attributed to a travel rule is outputted to the steering reaction force generator 50. The steering reaction force generator 50 controls the servomotor so that a vibration having the vibration frequency FREQ_ST_2 is generated, and a periodically varying steering reaction force is generated in the steering wheel 51.

When a negative determination is made in step SI 771, the process advances to step S1774, and a determination is made as to whether the second risk potential R2_Y in the left/right direction is equal to −1. When R2_Y=−1 and the road to the left is a road on which travel is not permitted, the process advances to step S1775 and a determination is made as to whether the steering wheel 51 has been turned from the steering angle δ in the left direction. When the steering direction is the left direction, the process advances to step S11773 and the vibration frequency FREQ_ST_2 calculated in accordance with the second risk potential R2_Y in the left/right direction attributed to a travel rule is outputted to the steering reaction force generator 50.

The process advances to step S1776 when step S1772, S1774, or S1775 makes a negative determination and vibrations that correspond to the second risk potential R2_Y in the left/right direction attributed to a travel rule are not produced. A determination is made in step S1776 as to whether the vibration frequency FREQ_ST_1 that corresponds to the first risk potential R1_Y in the left/right direction attributed to kinetic energy is equal to 0. When FREQ_ST_1=0, the process advances to step S1777 and the vibrations are not generated in from the steering wheel 51.

When a negative determination is made in step S1776, the process advances to step S1778 and a determination is made based, e.g., on the steering angle δ whether the driver has turned the steering wheel 51 further. When the driver has turned the steering wheel further, the process advances to step S1779 and the vibration frequency FREQ_ST_1 that corresponds to the first risk potential R1_Y in the left/right direction attributed to kinetic energy is outputted to the steering force generator 50. The steering force generator 50 controls the servomotor so that a vibration having the vibration frequency FREQ_ST_1 is generated, and a periodically varying steering reaction force is generated in the steering wheel 51.

Thus, the seventh embodiment described above has the following effects in addition to the effects obtained in the first to sixth embodiments described above.

First, the vehicle driving assist system 1 notifies the risk potentials R1 and R2 to the driver by using vibrations having different frequencies generated in the driver-operated driving operation devices. The risk potentials R1 and R2 attributed to different risk factors can be separately distinguished and indicated to the driver from a single driver-operated driving operation device by using vibrations having different frequencies.

Second, the vibration frequency FREQ_AP_2 that is used when the second risk potential R2 attributed to the travel rule is indicated is set so as to be higher than the vibration frequency FREQ_AP_1 that is used when the first risk potential R1 attributed to kinetic energy is indicated. When the host vehicle travels without following travel rule, the driver can be clearly made aware of such information.

In this configuration, the first risk potential R1_X in the forward/rearward direction attributed to kinetic energy is indicated by the operation reaction force generated in the accelerator pedal 41, and the second risk potential R2_X in the forward/rearward direction attributed to a travel rule is indicated using vibrations in the accelerator pedal 41.

Specifically, the reaction force control variable F_AP_1 is calculated based on the first risk potential R1_X in the forward/rearward direction in accordance with the map shown in FIG. 5, and the reaction force control variable F_AP_1 is outputted as the reaction force command value F_AP to the accelerator pedal reaction force generator 40. The vibration frequency FREQ_AP_2 is set to 0 when the second risk potential R2_X in the forward/rearward direction=0; the vibration frequency FREQ_AP_2 is set to FREQ1 when R2_X=1; and the calculated vibration frequency FREQ_AP_2 is outputted to the accelerator pedal reaction force generator 40.

Figure 29:
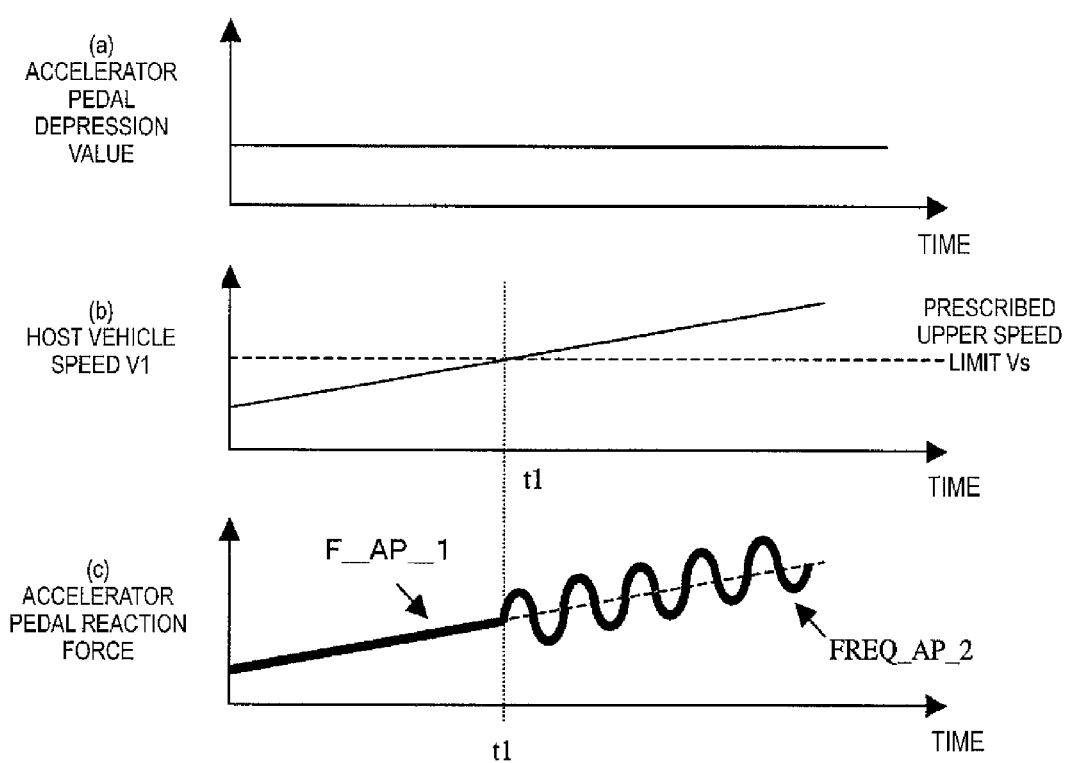
FIG. 29 is a series diagrams showing examples of changes that occur over time in the depressed value of the accelerator pedal, the host vehicle speed, and the accelerator pedal reaction force command value in a modified example of the seventh embodiment.

The effects of the risk potentials R1_X and R2_X in the forward/rearward direction in the modified example of the seventh embodiment will be described with reference to diagrams (a) to (c) of FIG. 29. Diagrams (a) to (c) of FIG. 29 show changes that occur over time in the depressed value of the accelerator pedal, the host vehicle speed V1, and the accelerator pedal reaction force command value F_AP, respectively. When the accelerator pedal 41 is depressed by a substantially fixed amount and the host vehicle speed V1 gradually increases, the first risk potential R1_X in the forward/rearward direction attributed to the kinetic energy of the host vehicle gradually increases, and the accelerator pedal reaction force command value F_AP (=F_AP_1) gradually increases as well.

When the host vehicle speed V1 exceeds the established speed limit Vs at time t1, a vibration is generated in the accelerator pedal 41 at a vibration frequency FREQ_AP_2 that corresponds to the second risk potential R2_X in the forward/rearward direction attributed to the travel rule of the host vehicle. Vibrations are further thereby generated in the accelerator pedal 41 for generating an operation reaction force that corresponds to the first risk potential R1_X in the forward/rearward direction attributed to kinetic energy. The generation of vibrations allows the driver to be clearly made aware that the risk attributed to a travel rule has increased, specifically, that the host vehicle speed V1 has exceeded the established speed limit Vs.

Thus, a continuous operation reaction force that corresponds to the first risk potential R1 is generated, and vibrations are generated when the host vehicle is traveling in a manner that is not in accordance with the travel rule. In other words, different risk potentials R1 and R2 attributed to different risk factors are indicated by different methods using a single driver-operated driving operation device. Therefore, different risk potentials R1 and R2 can be separately distinguished and indicated to the driver in a manner that is easy to perceive.

Eighth Embodiment

A vehicle driving assist system will now be explained in accordance with an eighth embodiment. The basic configuration of the vehicle driving assist system according to the eighth embodiment is the same as in the first embodiment shown in FIG. 1. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity. Thus, the points that differ from the first embodiment are mainly described below.

In the eighth embodiment, the output of an additional reaction force that varies in a discontinuous manner in accordance with the risk potentials R2_X and R2_Y attributed to the travel rule is stopped when the driver further depresses the accelerator pedal 41 or further turns the steering wheel 51 during addition of the discontinuous additional reaction force. In other words, the transmission control of the risk potentials R2_X and R2_Y attributed to the travel rule is overridden by the further depression of the accelerator pedal 41 or the further turning of the steering wheel 51 by the driver. The case in which the driver further depresses the accelerator pedal 41 and additionally turns the steering wheel 51 so that the transmission control of the risk potentials R2_X and R2_Y is stopped is referred to as an override operation.

Figure 30:
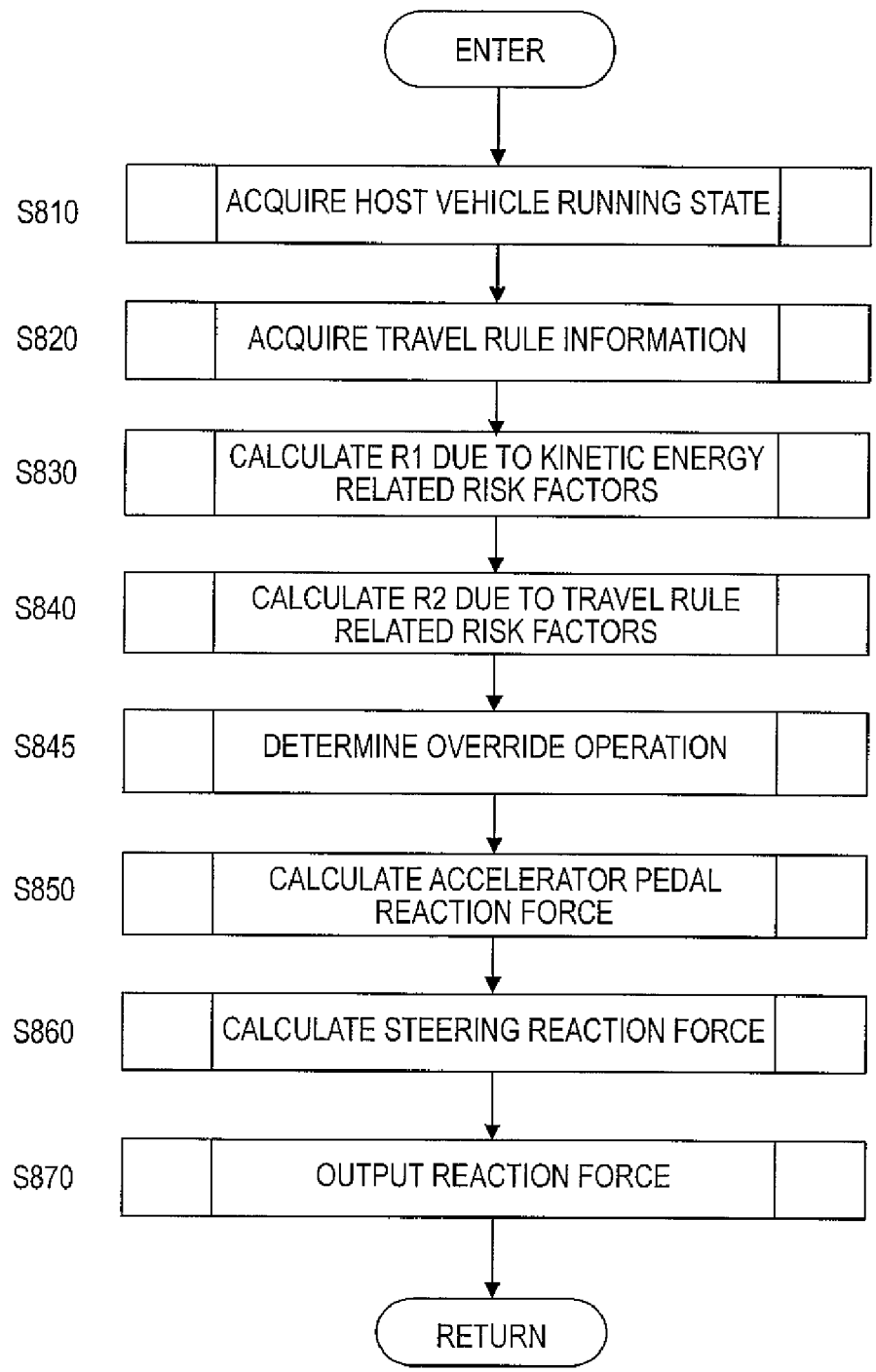
FIG. 30 is a flowchart showing the control processing steps executed for a vehicle driving assist control program according to an eighth embodiment.

The operation of the vehicle driving assist system according to the eighth embodiment is described in detail below with reference to FIG. 30. FIG. 30 is a flowchart showing the processing sequence for a vehicle driving assist control program in the controller 30. The processing steps are carried out in a continuous fashion at fixed intervals (50 msec, for example). The processing in steps S810 to S840 is the same as the processing in steps S110 to S140 of the flowchart shown in FIG. 2, and a description will therefore be omitted.

Figure 31:
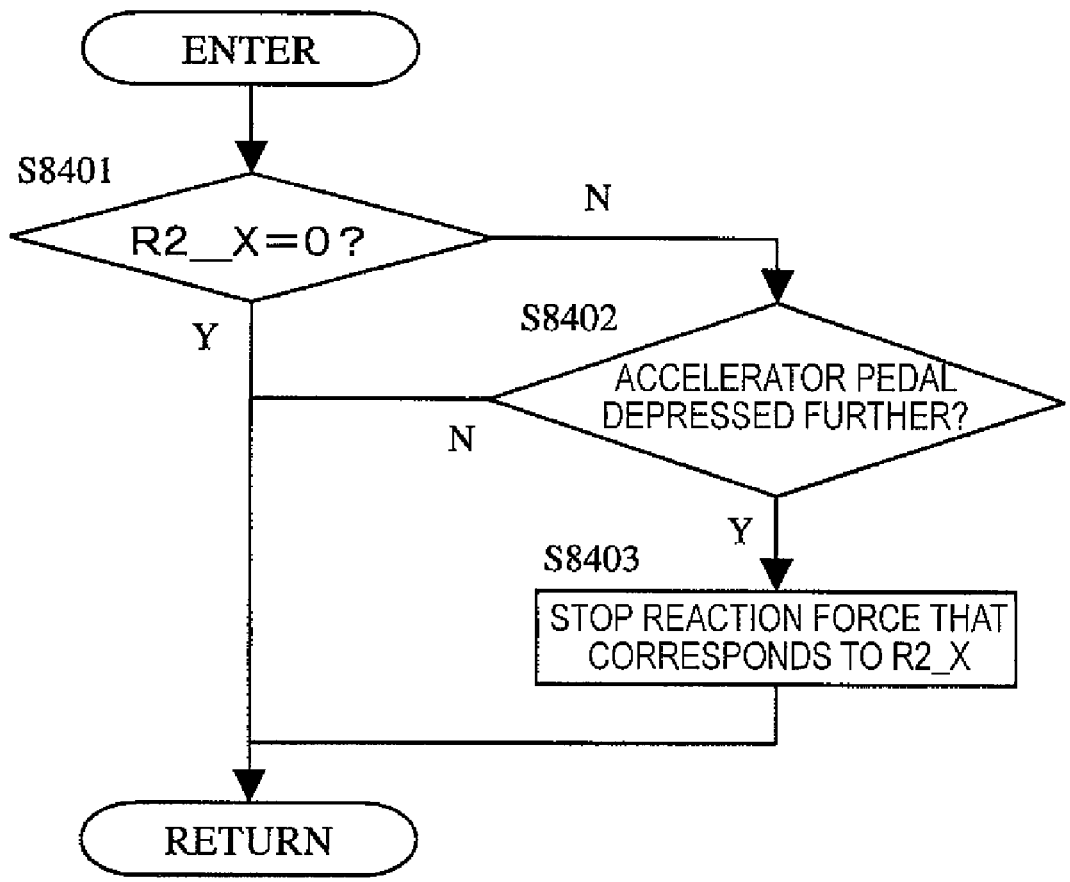
FIG. 31 is a flowchart showing the processing sequence for an override operation determination procedure related to the accelerator pedal operation.

In step S845, it is determined that the driver has carried out an override operation. The processing in this case will be described in accordance with the flowchart of FIGS. 31 and 32. First, the override operation related to the operation of the accelerator pedal 41 is determined in accordance with FIG. 31.

In step S8401, a determination is made as to whether the second risk potential R2_X in the forward/rearward direction attributed to the travel rule is equal to 0. When the second risk potential R2_X=0, the processing is ended. When the second risk potential R2_X=1 the process advances to step S8402 and a determination is made as to whether the accelerator pedal 41 has been further depressed. For example, when the accelerator pedal stroke sensor (not shown) detects that the accelerator pedal depression value has increased above a prescribed value, it is determined that the accelerator pedal 41 has been further depressed.

When the accelerator pedal 41 has been further depressed, the process advances to step S8403 and it is determined that the accelerator pedal operation reaction force that corresponds to the second risk potential R2_X in the forward/rearward direction has been stopped. Specifically, the reaction force control variable F_AP_2 is set to 0 when the reaction force control variable F_AP_2 based on the second risk potential R2_X in the forward/rearward direction is calculated in step S850. When it is determined in step S8402 that there is no further depression, it is determined that there is no override operation and the processing is ended.

Figure 32:
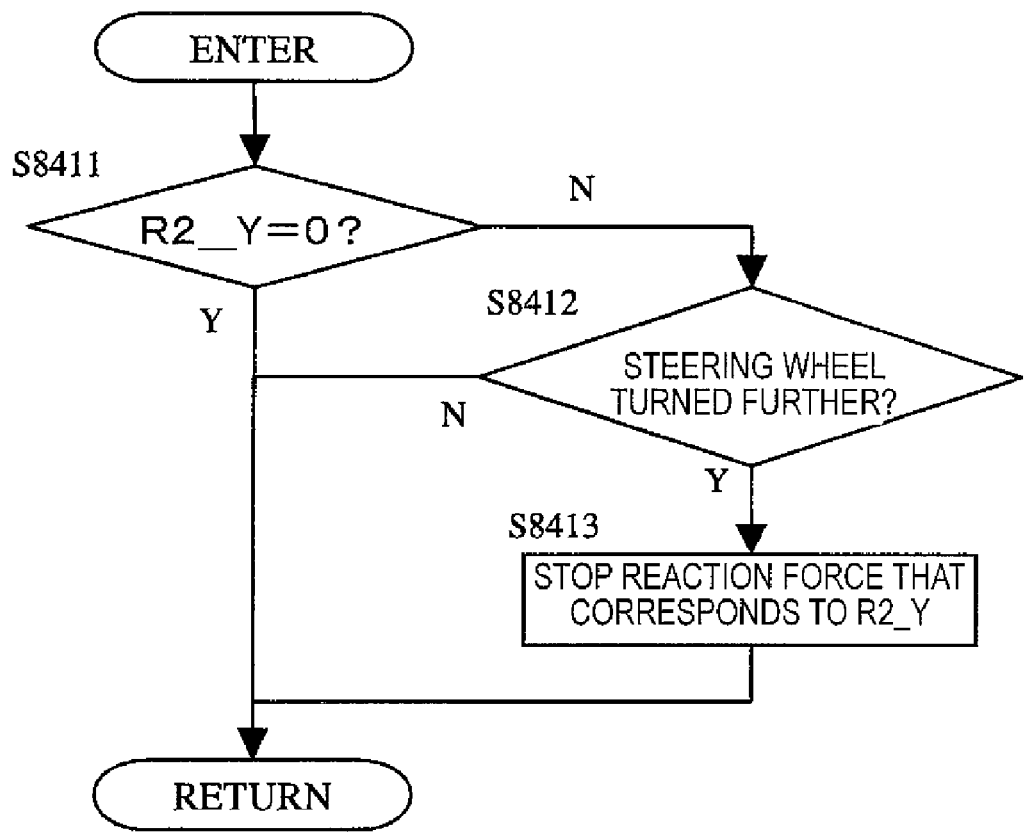
FIG. 32 is a flowchart showing the control processing steps executed for an override operation determination procedure related to the steering wheel operation.

Next, the override operation related to the operation of the steering wheel 51 is determined in accordance with FIG. 32.

In step S8411, a determination is made as to whether the second risk potential R2_Y in the left/right direction attributed to the travel rule is equal to 0. When R2_Y=0 the processing is ended. When R2_Y=1, the process advances to step S8412 and a determination is made as to whether the steering wheel 51 has been turned further. When the steering angle sensor 12 detects that the steering angle δ has been increase above a prescribed value in the further-turning direction, it is determined that the steering wheel 51 has been turned further.

When the steering wheel 51 has been further turned, the process advances to step S8413 and it is determined that the steering reaction force that corresponds to the second risk potential R2_Y in the left/right direction has been stopped. Specifically, T_ST_2 is set to 0 when the torque control variable T_ST_2 based on the second risk potential R2_Y in the left/right direction is calculated in step S860. When it is determined in step S8412 that there is no further depression, it is determined that there is no override operation and the processing is ended.

In step S850, the accelerator pedal reaction force command value F_AP is calculated based on the first risk potential R1_X in the forward/rearward direction attributed to kinetic energy and on the second risk potential R2_X in the forward/rearward direction attributed to the travel rule. When it has been determined, based on the override operation determination result of step S845, that an override operation has been carried out, the reaction force control variable F_AP_2 based on the second risk potential R2_X attributed to a travel rule is not calculated (F_AP_2=0).

In step S860, the torque command value T_ST is calculated based on the first risk potential R1_Y in the left/right direction attributed to kinetic energy and on the second risk potential R2_Y in the left/right direction attributed to a travel rule. When it has been deter_mined, based on the override operation determination result of step S845, that an override operation has been carried out, the torque control variable T_ST_2 based on the second risk potential R2_Y attributed to the travel rule is not calculated (T_ST_2=0).

In step S870, the accelerator pedal reaction force command value F_AP calculated in step S850 is outputted to the accelerator pedal reaction force generator 40, and the torque command value T_ST calculated in step S860 is outputted to the steering force generator 50, thereby ending the processing.

Thus, the eighth embodiment described above has the following effects in addition to the effects obtained in the first to seventh embodiments described above.

In the case that the vehicle driving assist system 1 further detects the operating state of a driver-operated driving operation device, and an operation reaction force that transmits a risk potential R2 attributed to the travel rule is generated, the generation of the operation reaction force that transmits the second risk potential R2 is stopped during farther operation of the driver-operated driving operation device. Specifically, the generation of an additional reaction force is stopped in the case that the accelerator pedal 41 has been further depressed when an added force that corresponds to the second risk potential R2_X is being generated in the accelerator pedal 41, or in the case that the steering wheel 51 has been turned further when an added force that corresponds to the second risk potential R2_Y is being generated in the steering wheel 51. The driving intentions of the driver can thereby be respected and control can be carried out with less annoyance when the driver has intentionally further depressed the accelerator pedal or additionally turned the steering wheel.

Even a system in which vibrations are used to transmit the second risk potential R2 attributed to the travel rule can be configured so that the generation of vibrations that correspond to the second risk potential R2 is stopped when it has been determined that an override operation has been carried out.

In the eighth embodiment described above, the accelerator pedal operation reaction force is controlled based on the risk potentials R1_X and R2_X in the forward/rearward direction, and the steering reaction force is controlled based on the risk potentials R1_Y and R2_Y in the left/right direction. However, no limitation is imposed by this configuration, and the configuration may be a system in which only the accelerator pedal operation reaction force is controlled based on the risk potentials R1_X and R2_X in the forward/rearward direction, or may be a system in which only the steering reaction force is controlled based on the risk potentials R1_Y and R2_Y in the left/right direction. The second or third embodiment may be combined with the fourth or fifth embodiment.

With the first to eighth embodiments described above, the second risk potential R2 attributed to the travel rule is determined based on whether the recommended speed has been exceeded, the established speed limit Vs has been exceeded, the vehicle is steered so as to enter a road on which travel is not permitted, and the like. However, no limitation is imposed by this configuration, and the configuration can be one in which the second risk potential R1 attributed to a travel rule is determined based on whether, e.g., a traffic light located ahead of the host vehicle is a red light, whether the intersection located ahead of the vehicle requires the host vehicle to come to a complete stop before proceeding, or in other situations. In this case, when then traffic light is red, or when the intersection located ahead of the vehicle requires the host vehicle to come to a complete stop before proceeding, the second risk potential R2_X in the forward/rearward direction is set to 1 and the additional reaction force added to the accelerator pedal 41 is a discontinuous reaction force.

In the first to eighth embodiment described above, the risk potentials R1_X and R1_Y in the forward/rearward direction attributed to kinetic energy are calculated based on the host vehicle speed V1 and lateral acceleration ay of the host vehicle, respectively. The risk potentials R1_X and R1_Y can be calculated by taking the vehicle weight in addition to the host vehicle speed V1 and lateral acceleration ay. In other words, the method for calculating the risk potentials R1_X and R1_Y is not limited to the methods described above as long as the risk potentials attributed to kinetic energy in the forward/rearward and left/right directions of the host vehicle can be accurately calculated.

The relationship between the host vehicle speed V1 and the first risk potential R1_X in the forward/rearward direction, and the relationship between the lateral acceleration ay and the first risk potential R1_Y in the left/right direction are not limited to those shown in FIGS. 3 and 4, and another map can be used that is designed so that the risk potentials R1_X and R1_Y increase with increased host vehicle speed V1 and lateral acceleration ay. The relationship between the first risk potential R1_X in the forward/rearward direction and the reaction force control variable F_AP_1, and the relationship between the first risk potential R1_Y in the left/right direction and the torque control variable T_ST_1 are also not limited to those shown in FIGS. 5 and 6.

In the first to eighth embodiments described above, one or more of the vehicle running state detection section 10, the travel rule acquisition section 20, the road condition sensor 60 and the visibility detector 70 function as a risk factor detection section. Also the controller 30 functions as a first risk potential calculation section, while the accelerator pedal reaction force generator 40 and steering reaction force generator 50 functions as a risk potential notification section. Also, the road surface condition sensor 60 and the visibility detector 70 functions as a traveling condition detection section that is preferably part of the risk factor detection section. The accelerator pedal 41, the steering wheel 51 and the controller 30 functions as an operating speed detection section and an operating traveling condition detection section.

Thus, while only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

What is claimed is:

1. A computer-implemented vehicle driving assist system comprising:
   a risk factor detection section configured to detect a plurality of potential risk factors related to a host vehicle, the risk factor detection section being further configured to detect a vehicle running state that is attributed to kinetic energy of the host vehicle as at least part of a first risk factor of the risk factors and detect a travel rule attributed to the host vehicle as at least part of a second risk factor of the risk factors, both of the first and second risk factors being unrelated to an obstacle around the host vehicle;
   a first risk potential calculation section configured to calculate a first risk potential attributed to the first risk factor from the risk factors that are detected;
   a second risk potential calculation section configured to calculate a second risk potential attributed to the second risk factor that is different than the first risk factor from the risk factors that are detected; and
   a risk potential notification section configured to notifying a driver of the first risk potential calculated by the first risk potential calculation section with a first risk potential notification and the second risk potential calculated by the second risk potential calculation section with a second risk potential notification using a common risk notification device for both the first and second notifications with the first and second notifications being different.

2. The vehicle driving assist system according to claim 1, wherein
   the common risk notification device is a driver-operated driving operation device; and
   the risk potential notification section is further configured to notify the driver of the first risk potential by generating a continuous operation reaction force in the driver-operated driving operation device as the first risk potential notification, and to notify the driver of the second risk potential by generating a discontinuous operation reaction force in the driver-operated driving operation device as the first risk potential notification.

3. The vehicle driving assist system according to claim 1, wherein
   the risk factor detection section is further configured to detect at least one of a host vehicle speed and a lateral acceleration as the vehicle running state;
   the first risk potential calculation section is further configured to calculate the first risk potential based on one of the host vehicle speed and the lateral acceleration that is attributed to the kinetic energy of the host vehicle; and
   the second risk potential calculation section is further configured to calculate the second risk potential based on the travel rule attributed to the host vehicle.

4. The vehicle driving assist system according to claim 2, wherein
the risk potential notification section is further configured to continuously increases the operation reaction force generated in the driver-operated driving operation device for the first risk potential notification as the first risk potential increases.

5. The vehicle driving assist system according to claim 2, wherein
the risk factor detection section is further configured to detect at least one of a road surface condition of a road on which the host vehicle is traveling and a visibility in front of the host vehicle as a traveling condition; and
the risk potential notification section being further configured to correct the operation reaction force generated in the driver-operated driving operation device in accordance with at least one of the visibility and the road surface condition.

6. The vehicle driving assist system according to claim 4, wherein
the risk factor detection section is further configured to detect when the host vehicle exceeds a prescribed upper speed limit set by the driver as the travel rule; and
the first risk potential calculation section increases the first risk potential as the host vehicle speed increases and approaches the prescribed upper speed limit.

7. The vehicle driving assist system according to claim 4, wherein
the risk factor detection section is further configured to detect the upper speed limit recommendation as a speed of the host vehicle when a residential road is being traveled as the travel rule; and
the first risk potential calculation section increases the first risk potential as the host vehicle speed increases and approaches upper speed limit.

8. The vehicle driving assist system according to claim 3, wherein
the risk factor detection section is further configured to detect whether a road exists in at least one of left and right directions in which travel is not permitted as the travel rule.

9. The vehicle driving assist system according to claim 3, wherein
the second risk potential calculation section is further configured to determine that the second risk potential is high when the host vehicle travels without following the travel rule; and
the risk potential notification section is further configured to increase the operation reaction force generated in the driver-operated driving operation device for the second risk potential notification in a stepwise fashion when the second risk potential is determined to be high by the second risk potential calculation section.

10. The vehicle driving assist system according to claim 3, wherein
the risk factor detection section is further configured to detect an operation speed of the driver-operated driving operation device;
the second risk potential calculation section is further configured to determine that the second risk potential is high when the host vehicle travels without following a travel rule; and
the risk potential notification section is further configured to increase the operation reaction force generated in the driver-operated driving operation device for the second risk potential notification in accordance with the operation speed of the driver-operated driving operation device when the second risk potential is determined to be high by the second risk potential calculation section.

11. The vehicle driving assist system according to claim 9, wherein
the risk factor detection section is further configured to detect an operating state of the driver-operated driving operation device; and
the risk potential notification section being further configured to stop generating the operation reaction force in the driver-operated driving operation device corresponding to the second risk potential when the driver-operated driving operation device is further operated while the operation reaction force in the driver-operated driving operation device corresponding to the second risk potential is being generated.

12. The vehicle driving assist system according to claim 1, wherein
the single risk notification device is a driver-operated driving operation device; and
the risk potential notification section is further configured to notify the driver of the first and second risk potentials by vibrating the driver-operated driving operation device at different frequencies for each of the first and second risk potentials.

13. The vehicle driving assist system according to claim 12, wherein
the risk factor detection section is further configured to detect at least one of a host vehicle speed and a lateral acceleration as the vehicle running state;
the first risk potential calculation section is further configured to calculate the first risk potential based on one of the host vehicle speed and the lateral acceleration that is attributed to the kinetic energy of the host vehicle; and
the second risk potential calculation section is further configured to calculate the second risk potential based on the travel rule attributed to the host vehicle.

14. The vehicle driving assist system according to claim 13, wherein
the risk potential notification section sets the vibration frequency used during transmission of the second risk potential to be higher than the vibration frequency used during transmission of the first risk potential.

15. The vehicle driving assist system according to claim 2, wherein the driver-operated driving operation device is an accelerator pedal.

16. The vehicle driving assist system according to claim 2, wherein the driver-operated driving operation device is a steering wheel.

17. The vehicle driving assist system according to claim 1, wherein
the first risk potential calculation section is further configured to calculate the first risk potential based on the vehicle running state that is attributed to the kinetic energy of the host vehicle; and
the second risk potential calculation section is further configured to calculate the second risk potential based on the travel rule attributed to the host vehicle.

18. A vehicle equipped with the vehicle driving assist system according to claim 1, wherein
the vehicle driving assist system is operatively installed to a vehicle body.

19. A computer-implemented vehicle driving assist system comprising:
means for detecting a plurality of potential risk factors related to a host vehicle, the risk factors including a vehicle running state that is attributed to kinetic energy of the host vehicle as at least part of a first risk factor and a travel rule attributed to the host vehicle as at least part of a second risk factor, both of the first and second risk factors being unrelated to an obstacle around the host vehicle;

means for calculating a first risk potential attributed to the first risk factor from the risk factors that were detected;

means for calculating a second risk potential attributed to the second risk factor that is different than the first risk factor from the risk factors that were detected; and means for notifying a driver of the first risk potential with a first risk potential notification and the second risk potential with a second risk potential notification using a common risk notification means for both the first and second notifications with the first and second notifications being different.

20. A computer-implemented vehicle driving assistance method comprising:

detecting a plurality of potential risk factors related to a host vehicle, the risk factors including a vehicle running state that is attributed to kinetic energy of the host vehicle as at least part of a first risk factor and a travel rule attributed to the host vehicle as at least part of a second risk factor, both of the first and second risk factors being unrelated to an obstacle around the host vehicle;

calculating a first risk potential attributed to the first risk factor from the risk factors that were detected;

calculating a second risk potential attributed to the second risk factor that is different than the first risk factor from the risk factors that were detected; and selectively notifying a driver of the first risk potential with a first risk potential notification and the second risk potential with a second risk potential notification using a common risk notification device for both the first and second notifications with the first and second notifications being different.

* * * * *